(12) United States Patent
Flugge et al.

(10) Patent No.: US 10,754,122 B2
(45) Date of Patent: Aug. 25, 2020

(54) CARRIER FRAME AND CIRCUIT BOARD FOR AN ELECTRONIC DEVICE

(71) Applicant: COGNEX CORPORATION, Natick, MA (US)

(72) Inventors: Kai Flugge, Aachen (DE); Laurens Nunnink, Simpelveld (NL); Richard Reuter, Wurselen (DE); David R. King, Hudson, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/687,952

(22) Filed: Aug. 28, 2017

(65) Prior Publication Data

US 2018/0231736 A1 Aug. 16, 2018

Related U.S. Application Data

(63) Continuation of application No. 13/655,972, filed on Oct. 19, 2012, now Pat. No. 9,746,636.

(51) Int. Cl.
| | |
|---|---|
| *G02B 7/08* | (2006.01) |
| *H04N 5/225* | (2006.01) |
| *G03B 17/02* | (2006.01) |
| *G03B 17/12* | (2006.01) |

(52) U.S. Cl.
CPC ............ *G02B 7/08* (2013.01); *G03B 17/02* (2013.01); *G03B 17/12* (2013.01); *H04N 5/2254* (2013.01); *G03B 2217/002* (2013.01); *Y10T 29/49769* (2015.01); *Y10T 29/49863* (2015.01)

(58) Field of Classification Search
CPC ........ G02B 7/08; H04N 5/2254; G03B 17/02; G03B 17/12
See application file for complete search history.

(56) References Cited

U.S. PATENT DOCUMENTS

| | | |
|---|---|---|
| 3,698,254 A | 10/1972 | Bradt |
| 3,891,278 A | 6/1975 | Grosseau |
| 3,940,777 A | 2/1976 | Komine |
| 4,072,396 A | 2/1978 | Ross |
| 4,160,590 A | 7/1979 | Reynard |
| 4,314,752 A | 2/1982 | Ishizaka et al. |

(Continued)

FOREIGN PATENT DOCUMENTS

| | | |
|---|---|---|
| CN | 101435973 A | 5/2009 |
| EP | 0957448 A2 | 11/1999 |

(Continued)

OTHER PUBLICATIONS

Cognex Corporation, DataMan 100 SHD/C-Mount Kit Removal Instructions, 590-7042 Copyright 2007, 2 pages.

(Continued)

*Primary Examiner* — Antoinette T Spinks
(74) *Attorney, Agent, or Firm* — Quarles & Brady LLP

(57) ABSTRACT

An electronic device includes an electronic circuit board containing a processing element and a vision sensor. A carrier frame is used to support the electronic circuit board. An optical element is positioned over the sensor and supported by the carrier frame. The electronic circuit board is bent to reduce the length, thickness and/or width of the electronic device, without increasing the others of the length, thickness and/or width of the electronic device.

24 Claims, 20 Drawing Sheets

(56) References Cited

U.S. PATENT DOCUMENTS

| | | |
|---|---|---|
| 4,441,799 A | 4/1984 | Enomoto |
| 4,478,491 A | 10/1984 | Kawai |
| 4,490,018 A | 12/1984 | Yokotsuka |
| 4,494,828 A | 1/1985 | Masumoto et al. |
| 4,591,253 A | 5/1986 | Hecker et al. |
| 4,871,238 A | 10/1989 | Sato et al. |
| 4,877,949 A | 10/1989 | Danielson et al. |
| 4,989,027 A | 1/1991 | Ishii et al. |
| 5,019,699 A | 5/1991 | Koenck |
| 5,155,343 A | 10/1992 | Chandler |
| 5,308,966 A | 5/1994 | Danielson et al. |
| 5,313,053 A | 5/1994 | Koenck |
| 5,331,176 A | 7/1994 | San't Anselmo et al. |
| 5,331,178 A | 7/1994 | Fukuda et al. |
| 5,349,172 A | 9/1994 | Roustaei |
| 5,365,597 A | 11/1994 | Holeva |
| 5,378,883 A | 1/1995 | Batterman et al. |
| 5,399,846 A | 3/1995 | Pavlidis et al. |
| 5,471,043 A | 11/1995 | Knapp et al. |
| 5,473,150 A | 12/1995 | Huhn et al. |
| 5,500,516 A | 3/1996 | Durbin |
| 5,513,264 A | 4/1996 | Wang et al. |
| 5,569,902 A | 10/1996 | Wood et al. |
| 5,572,006 A | 11/1996 | Wang et al. |
| 5,587,843 A | 12/1996 | Chen |
| 5,596,368 A | 1/1997 | Capper et al. |
| 5,598,007 A | 1/1997 | Bunce et al. |
| 5,627,360 A | 5/1997 | Rudeen |
| 5,640,001 A | 6/1997 | Danielson et al. |
| 5,659,167 A | 8/1997 | Wang et al. |
| 5,672,858 A | 9/1997 | Li et al. |
| 5,715,095 A | 2/1998 | Hiratsuka et al. |
| 5,717,969 A | 2/1998 | Miyamoto et al. |
| 5,734,153 A | 3/1998 | Swartz et al. |
| 5,756,981 A | 5/1998 | Roustaei et al. |
| 5,773,810 A | 6/1998 | Hussey et al. |
| 5,783,811 A | 7/1998 | Feng et al. |
| 5,786,586 A | 7/1998 | Pidhirny et al. |
| 5,793,033 A | 8/1998 | Feng et al. |
| 5,805,362 A | 9/1998 | Hayes |
| 5,811,828 A | 9/1998 | Laser |
| 5,825,006 A | 10/1998 | Longacre et al. |
| 5,825,559 A | 10/1998 | Johnson et al. |
| 5,834,754 A | 11/1998 | Feng et al. |
| 5,844,229 A | 12/1998 | Rockstein et al. |
| 5,884,105 A * | 3/1999 | Nomura .......... G02B 7/08 396/72 |
| 5,945,658 A | 8/1999 | Salatto et al. |
| 5,949,057 A | 9/1999 | Feng |
| 5,969,321 A | 10/1999 | Danielson et al. |
| 5,992,751 A | 11/1999 | Laser |
| 6,060,722 A | 5/2000 | Havens et al. |
| 6,066,857 A | 5/2000 | Fantone et al. |
| 6,073,851 A | 6/2000 | Olmstead et al. |
| 6,098,887 A | 8/2000 | Figarella et al. |
| 6,115,197 A | 9/2000 | Funahashi |
| 6,179,208 B1 | 1/2001 | Feng |
| 6,223,986 B1 | 5/2001 | Bobba et al. |
| 6,223,988 B1 | 5/2001 | Batterman et al. |
| 6,285,787 B1 | 9/2001 | Kawachi et al. |
| 6,327,442 B1 | 12/2001 | Ichikawa |
| 6,340,114 B1 | 1/2002 | Correa et al. |
| 6,347,163 B2 | 2/2002 | Roustaei et al. |
| 6,431,452 B2 | 8/2002 | Feng |
| 6,445,450 B1 | 9/2002 | Matsumoto |
| 6,449,430 B1 | 9/2002 | Tasaka et al. |
| 6,474,556 B2 | 11/2002 | Dickson et al. |
| 6,527,183 B2 | 3/2003 | Bard et al. |
| 6,607,132 B1 | 8/2003 | Dvorkis et al. |
| 6,636,298 B1 | 10/2003 | Bachelder |
| 6,651,886 B2 | 11/2003 | Gurevich et al. |
| 6,651,888 B1 | 11/2003 | Gurevich et al. |
| 6,669,093 B1 | 12/2003 | Meyerson et al. |
| 6,681,994 B1 | 1/2004 | Koenck |
| 6,689,998 B1 | 2/2004 | Bremer |
| 6,712,270 B2 | 3/2004 | Leach et al. |
| 6,729,546 B2 | 5/2004 | Roustaei |
| 6,765,393 B2 | 7/2004 | Pierenkemper et al. |
| 6,805,295 B2 | 10/2004 | Barkan et al. |
| 6,808,114 B1 | 10/2004 | Palestini et al. |
| 6,809,847 B2 | 10/2004 | McQueen |
| 6,811,085 B2 | 11/2004 | Carlson et al. |
| 6,827,270 B2 | 12/2004 | Yomogida et al. |
| 6,832,725 B2 | 12/2004 | Gardiner et al. |
| 6,832,729 B1 | 12/2004 | Perry et al. |
| 6,837,433 B2 | 1/2005 | Jam et al. |
| 6,845,915 B2 | 1/2005 | Krichever et al. |
| 6,866,198 B2 | 3/2005 | Patel et al. |
| 6,877,664 B1 | 4/2005 | Oliva et al. |
| 6,891,679 B2 | 5/2005 | Atarashi et al. |
| 6,918,538 B2 | 7/2005 | Breytman et al. |
| 6,974,085 B1 | 12/2005 | Koenck |
| 6,976,629 B2 | 12/2005 | Carlson |
| 6,997,385 B2 | 2/2006 | Palestini et al. |
| 7,007,843 B2 | 3/2006 | Poloniewicz |
| 7,021,542 B2 | 4/2006 | Patel et al. |
| 7,025,271 B2 | 4/2006 | Dvorkis et al. |
| 7,025,272 B2 | 4/2006 | Yavid et al. |
| 7,025,273 B2 | 4/2006 | Breytman et al. |
| 7,055,747 B2 | 6/2006 | Havens et al. |
| 7,063,256 B2 | 6/2006 | Anderson et al. |
| 7,073,715 B2 | 7/2006 | Patel et al. |
| 7,075,663 B2 | 7/2006 | Canini |
| 7,077,325 B2 | 7/2006 | Tan et al. |
| 7,090,137 B1 | 8/2006 | Bennett |
| 7,097,101 B2 | 8/2006 | Kogan et al. |
| 7,097,105 B2 | 8/2006 | Wilz et al. |
| 7,128,266 B2 | 10/2006 | Zhu et al. |
| 7,147,159 B2 | 12/2006 | Longacre et al. |
| 7,182,260 B2 | 2/2007 | Gurevich et al. |
| 7,201,318 B2 | 4/2007 | Craen et al. |
| 7,222,793 B2 | 5/2007 | Patel |
| 7,224,540 B2 | 5/2007 | Olmstead et al. |
| 7,264,162 B2 | 9/2007 | Barkan |
| 7,270,274 B2 | 9/2007 | Hennick et al. |
| 7,287,264 B2 * | 10/2007 | Akanuma .......... G11B 7/0932 720/681 |
| 7,296,749 B2 | 11/2007 | Massieu |
| 7,296,751 B2 | 11/2007 | Barber et al. |
| 7,311,260 B2 | 12/2007 | Zosel et al. |
| 7,315,241 B1 | 1/2008 | Daily et al. |
| 7,383,067 B2 | 6/2008 | Phillips et al. |
| 7,387,246 B2 | 6/2008 | Palestini et al. |
| 7,395,970 B2 | 7/2008 | Poloniewicz et al. |
| 7,414,702 B1 | 8/2008 | Dunbar, Jr. |
| 7,454,841 B2 | 11/2008 | Burns et al. |
| 7,500,612 B2 | 3/2009 | Shi et al. |
| 7,500,614 B2 | 3/2009 | Barber et al. |
| 7,549,582 B1 | 6/2009 | Nunnink |
| 7,686,223 B2 | 3/2010 | Vinogradov et al. |
| 7,714,931 B2 | 5/2010 | Singh et al. |
| 7,729,570 B2 | 6/2010 | Yamada et al. |
| 7,878,403 B2 | 2/2011 | Hennick et al. |
| 7,907,840 B2 | 3/2011 | Schack et al. |
| 7,967,205 B2 | 6/2011 | Pankow et al. |
| 8,134,116 B2 | 3/2012 | Nunnink et al. |
| 9,513,458 B1 | 12/2016 | Flugge et al. |
| 9,746,636 B2 | 8/2017 | Flugge et al. |
| 2002/0014532 A1 | 2/2002 | Yomogida et al. |
| 2002/0034320 A1 | 3/2002 | Mann |
| 2002/0039099 A1 | 4/2002 | Harper |
| 2002/0074403 A1 | 6/2002 | Krichever et al. |
| 2002/0135886 A1 | 9/2002 | Onda |
| 2002/0171745 A1 | 11/2002 | Ehrhart |
| 2002/0191309 A1 | 12/2002 | Taylor et al. |
| 2003/0019934 A1 | 1/2003 | Hunter et al. |
| 2003/0020491 A1 | 1/2003 | Perenkemper et al. |
| 2003/0062413 A1 | 4/2003 | Gardiner et al. |
| 2003/0156400 A1 | 8/2003 | Dibene, II et al. |
| 2003/0201327 A1 | 10/2003 | Jam et al. |
| 2003/0205620 A1 | 11/2003 | Byun et al. |
| 2003/0226895 A1 | 12/2003 | Havens et al. |
| 2004/0020990 A1 | 2/2004 | Havens et al. |
| 2004/0130656 A1 | 7/2004 | Why et al. |

(56) References Cited

U.S. PATENT DOCUMENTS

| | | |
|---|---|---|
| 2004/0223074 A1 | 11/2004 | Takada |
| 2004/0238637 A1 | 12/2004 | Russell et al. |
| 2005/0035204 A1 | 2/2005 | Knappert et al. |
| 2005/0045725 A1 | 3/2005 | Gurevich et al. |
| 2005/0103851 A1 | 5/2005 | Zhu et al. |
| 2005/0103854 A1 | 5/2005 | Zhu et al. |
| 2005/0103857 A1 | 5/2005 | Zhu et al. |
| 2005/0103858 A1 | 5/2005 | Zhu et al. |
| 2005/0133601 A1 | 6/2005 | Yomogida et al. |
| 2005/0167504 A1 | 8/2005 | Mier et al. |
| 2005/0180037 A1 | 8/2005 | Masterson |
| 2005/0199725 A1 | 9/2005 | Craen et al. |
| 2005/0218231 A1 | 10/2005 | Massieu |
| 2006/0027659 A1 | 2/2006 | Patel et al. |
| 2006/0034596 A1 | 2/2006 | Yamazaki et al. |
| 2006/0043187 A1 | 3/2006 | He et al. |
| 2006/0043191 A1 | 3/2006 | Patel et al. |
| 2006/0055819 A1 | 3/2006 | Pokrovsky et al. |
| 2006/0060653 A1 | 3/2006 | Wittenberg et al. |
| 2006/0081712 A1 | 4/2006 | Rudeen et al. |
| 2006/0213994 A1 | 9/2006 | Faiz et al. |
| 2006/0216014 A1 | 9/2006 | Morinaga et al. |
| 2007/0057067 A1 | 3/2007 | He |
| 2007/0131770 A1 | 6/2007 | Nunnink |
| 2007/0164115 A1 | 7/2007 | Joseph et al. |
| 2007/0241195 A1 | 10/2007 | Hussey et al. |
| 2008/0121168 A1 | 5/2008 | Ryznar et al. |
| 2008/0129858 A1 | 6/2008 | Yu |
| 2008/0170141 A1 | 7/2008 | Tam et al. |
| 2009/0057413 A1 | 3/2009 | Vinogradov |
| 2009/0159684 A1 | 6/2009 | Barber et al. |
| 2009/0166424 A1 | 7/2009 | Gerst et al. |
| 2009/0176185 A1* | 7/2009 | Chen ................. A61B 1/00052 433/29 |
| 2009/0200380 A1 | 8/2009 | Longacre et al. |
| 2009/0207300 A1 | 8/2009 | Fujita |
| 2009/0219433 A1 | 9/2009 | Higuchi |
| 2009/0277668 A1 | 11/2009 | Kinyon |
| 2009/0284844 A1* | 11/2009 | Koc ................. G01D 5/34753 359/694 |
| 2010/0176319 A1 | 7/2010 | Nunnink et al. |
| 2010/0177319 A1 | 7/2010 | Towers et al. |
| 2010/0326703 A1* | 12/2010 | Gilad ................ A61B 1/041 174/254 |
| 2011/0019106 A1 | 1/2011 | Huebner |
| 2011/0019162 A1 | 1/2011 | Huebner |
| 2011/0019914 A1 | 1/2011 | Bimber et al. |
| 2011/0058023 A1 | 3/2011 | Boles et al. |
| 2011/0068174 A1 | 3/2011 | Miyoshi et al. |
| 2011/0102667 A1 | 5/2011 | Chua et al. |
| 2011/0279675 A1 | 11/2011 | Mano et al. |
| 2012/0068629 A1 | 3/2012 | Matsuda et al. |
| 2012/0084976 A1 | 4/2012 | Yu et al. |
| 2012/0147259 A1 | 6/2012 | Hasegawa et al. |
| 2012/0169918 A1 | 7/2012 | Hasegawa et al. |
| 2016/0178869 A1* | 6/2016 | Shen ................. G02B 13/0035 348/208.11 |

FOREIGN PATENT DOCUMENTS

| | | |
|---|---|---|
| EP | 0574024 B1 | 9/2001 |
| EP | 1308875 A2 | 5/2003 |
| EP | 0755018 B1 | 12/2003 |
| EP | 1519298 A2 | 3/2005 |
| EP | 0745951 B1 | 4/2005 |
| JP | S5543531 A | 3/1980 |
| JP | S63168416 U1 | 11/1988 |
| JP | H02132204 U | 11/1990 |
| JP | H09128471 A | 5/1997 |
| JP | H10134133 A | 5/1998 |
| JP | H11133250 A | 5/1999 |
| JP | H11149106 A | 6/1999 |
| JP | H11127 U | 10/1999 |
| JP | 2000270272 A | 9/2000 |
| JP | 2005062385 A | 3/2005 |
| JP | 2006146207 A | 6/2006 |
| JP | 2006261395 A | 9/2006 |
| JP | 2007274565 A | 10/2007 |
| JP | 2009080282 A | 4/2009 |
| JP | 2009530665 A | 8/2009 |
| JP | 2010200008 A | 9/2010 |
| JP | 2010266695 A | 11/2010 |
| JP | 2011017790 A | 1/2011 |
| WO | 02073953 A2 | 9/2002 |
| WO | 03062956 A2 | 7/2003 |
| WO | 2005050390 A2 | 6/2005 |
| WO | 2010081060 A1 | 7/2010 |

OTHER PUBLICATIONS

Cognex Corporation, Press Release, Cognex Expands Reading Capability, Oct. 9, 2007, 1 page.

* cited by examiner

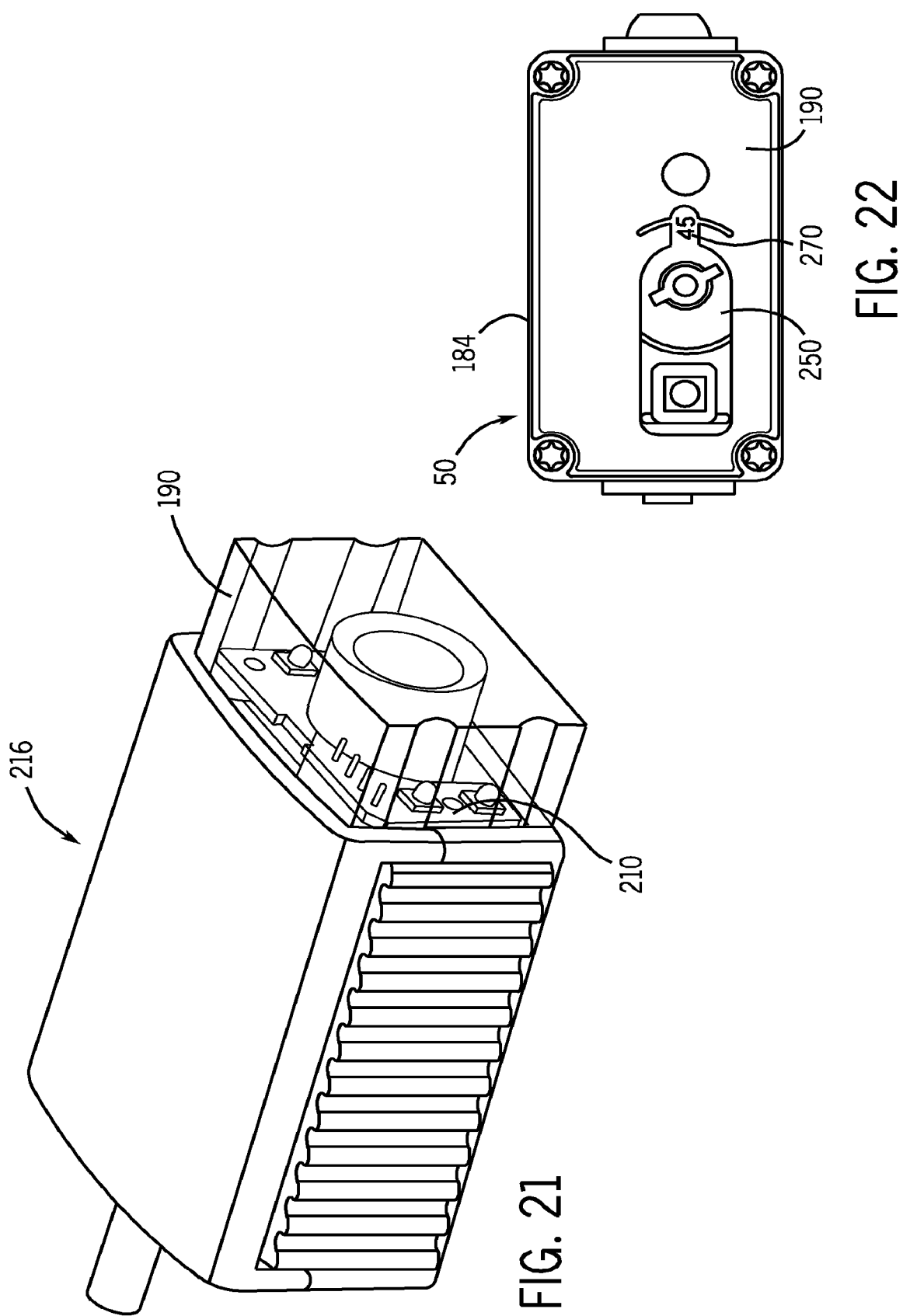

CARRIER FRAME AND CIRCUIT BOARD FOR AN ELECTRONIC DEVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE TECHNOLOGY

The present technology relates to the assembly of an electronic device, and more specifically, to an electronic device assembled with a printed circuit board and a carrier frame supporting the printed circuit board.

Most if not all electronic devices include one or more printed circuit boards (PCBs). During assembly, the board(s) are screwed to or otherwise connected to a portion of the electronic device's housing or other boards within the housing. One type of electronic device is an imaging device, more generally referred to as a camera. An imaging device is generally used to inspect, locate and/or acquire an image of an object. For example, in manufacturing applications, imaging systems can be used to detect defects in a manufactured object by acquiring images of the object and using various types of image processing algorithms to analyze the images. Unlike traditional cameras that use film to capture and store an image, some imaging devices use various electronic, solid-state, and other devices including vision sensors, controllers, illumination devices, lenses, and the like.

Some imaging devices can include a housing with the solid state devices mounted to several rigid PCBs, with the rigid PCBs held in the desired configuration by the housing. One of the several rigid PCBs needs to be aligned with a lens, and the lens needs to be aligned with an opening in the housing. Connectors are used to connect the one or more of the PCBs together, which adds size, cost, assembly time, and possible areas for failure. The size of the housing is limited to the size of the various solid-state devices and the rigid PCBs used to support them.

Improvements have been made in the area of printed circuit boards for electronic devices. PCBs are now available in flexible form, and a hybrid of rigid and flexible, known as rigid-flex. The hybrid rigid-flex PCB generally consists of rigid and flexible substrates that are laminated together into a single structure. Another form of PCB is known as a rigidized flex construction, which is simply flex circuits that include stiffeners attached to provide support for the electronic components on the circuit board. A rigid-flex circuit typically has conductors on the rigid layers, which differentiates it from multi-layer circuits with stiffeners.

The electronic devices of the prior art have several disadvantages in not only the assembly process, but in the overall size and limits on the serviceability of rigid circuit boards and reliability of PCB connectors. What is needed are systems and methods that use a carrier frame to support the PCBs for easy assembly and for support of other device components, without the problems and drawbacks associated with rigid PCBs.

BRIEF SUMMARY OF THE TECHNOLOGY

The present embodiments overcomes the disadvantages of the prior art by incorporating the use of a carrier frame to support PCBs. The PCB can be positioned around and supported by the carrier frame, and additional electronic and solid-state devices can be supported by the PCB and/or the carrier frame.

Accordingly, some embodiments comprise an adjustable lens device. The adjustable lens device includes a lens, with the lens including a lens base and a lens barrel extending from the lens base. The adjustable lens device can also include a carrier frame, with the carrier frame including an aperture, the aperture including a rim. The aperture can be sized to receive at least the lens base. A lens focus fix can be included, with the lens focus fix including a ratchet portion and a lens retainer portion. The ratchet portion can include at least one ratchet arm extending from the ratchet portion, with the at least one ratchet arm including an engagement end, the engagement end being sized to engage at least one of a plurality of mating engagement apparatus positioned about the rim. The lens retainer portion can include an engagement portion, the engagement portion to engage the lens to restrain movement of the lens. The lens focus fix can be rotatable to adjust a focal position of the lens, such that when the lens focus fix is rotated a first distance in a first direction, the lens retainer portion causes the lens to rotate a second distance in the first direction.

Other embodiments also comprise an electronic device. The electronic device includes an electronic circuit board containing a processing element and a vision sensor, the electronic circuit board comprising a plurality of circuit boards coupled together with flexible circuit board. A carrier frame can be used to support the electronic circuit board. A lens can be positioned over the vision sensor and supported by the carrier frame, the lens at least partially positioned within a volume defined by the electronic circuit board, with the lens position being adjustable in relation to the carrier frame and the vision sensor. A lens focus fix can be coupled to the carrier frame and in contact with the lens.

Consistent with the above, some embodiments include a method for assembling an electronic device. The method includes providing a carrier frame, with the carrier frame including a plurality of restraints to support an electronic circuit board; providing an electronic circuit board, the electronic circuit board including a vision sensor and a processor; bending the electronic circuit board around at least a portion of the carrier frame; engaging the electronic circuit board with the plurality of restraints; positioning a lens over the vision sensor, the carrier frame supporting the lens over the vision sensor; and restraining the lens with a lens focus fix, the lens focus fix contacting the lens and the carrier frame, such that rotating the lens focus fix a first distance in a first direction causes the lens to rotate a second distance in the first direction.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIG. 21 is a perspective view of an enclosed electronic device and including an illumination device, as shown in FIG. 20; and FIG. 22 is a plan view of the electronic device as seen in FIG. 9, and showing the electronic device enclosed and with a front cover providing a partial view of a lens focus fix;

Figure 1:
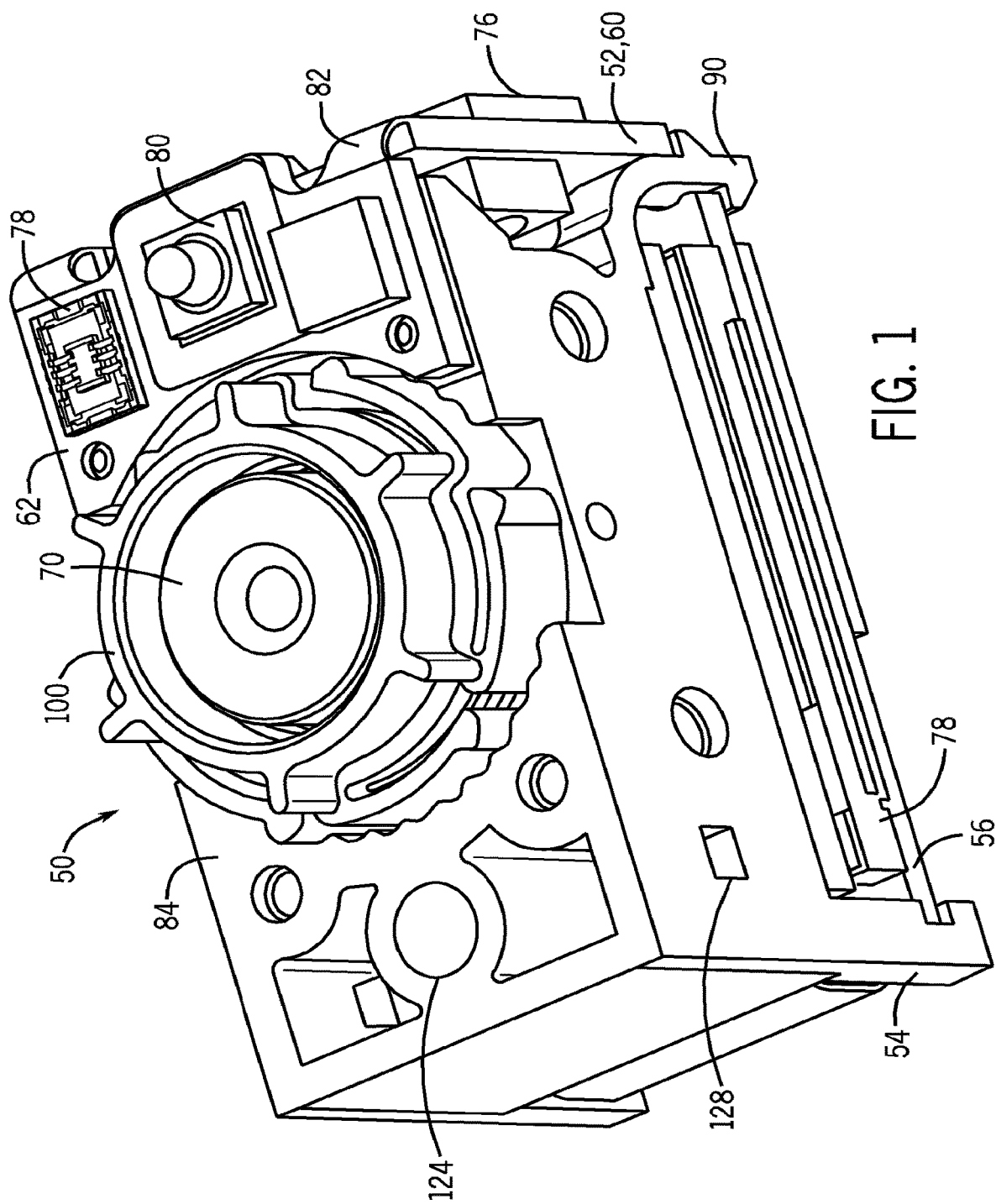
FIG. 1 is a perspective view of one embodiment of an electronic device in accordance with the present embodiments and showing one orientation of a rigid-flex PCB supported by a carrier frame.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory medium" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory medium" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates both an electronic device configuration and systems and methods for assembling and using an electronic device having a carrier frame to support PCBs.

The various embodiments of an electronic device will be described in connection with an imaging device that is assembled using a carrier frame, with rigid-flex PCB positioned or bent on, in, and/or around the carrier frame. That is because the features and advantages of the technology are well suited for this purpose. Still, it should be appreciated that the various aspects of the technology can be applied in other forms of electronic devices and PCBs and in other systems and assemblies that may benefit from using rigid-flex PCB and a carrier frame. Use of rigid-flex PCB positioned around a carrier frame reduces cost and results in a compact cubical form for electronic devices. Rigid-flex PCB and a carrier frame can be used to reduce at least one of a length, a thickness, and a width of the electronic device, without increasing the others of the length, the thickness, and the width.

An exemplary imaging device can be embedded into other electronic devices to add machine vision and/or code reading functions, and can also be a standalone imaging device. When embedded, such an electronic device can be an industrial, medical, mobile, or retail device, as non-limiting examples, and can be used in a manufacturing assembly, test, measurement, automation, and/or control application, among others, as non-limiting examples. When standalone, the imaging device can be integrated into an enclosure, and can include connectors, I/O, power circuitry, and user interface components, for example. The exemplary imaging device may use image acquisition software operable to perform any of various types of image acquisitions. The imaging device can perform machine vision tasks and/or decode images containing machine readable symbols, as non-limiting examples.

Referring to FIG. 1, the various embodiments described herein can reduce the size and/or cost of an imaging device 50. In some embodiments, some or all of the electronic components can be placed on one or more rigid-flex PCBs 52 that can be positioned on and/or in and/or around a carrier frame 54. The carrier frame 54 can support the PCB 52 and other components, including imaging device mechanics, electronics, and/or imaging device optics. In this way, the imaging device can achieve a maximal PCB area with a minimal cubical size. The overall size of the imaging device 50 can be reduced by use of the rigid-flex PCB 52 bent or folded around the carrier frame 54. This reduction in size can be achieved by subsuming a lens barrel volume within the interior of the folded PCB 52.

In order to optimize heat dissipation, embodiments can include some or all heat producing components placed on the PCB 52 to be facing to the outside of the imaging device 50 to help radiate heat away from the imaging device. In some embodiments, a connection between different board configurations of the PCB 52 can be achieved by a flexible component 82 of the rigid-flex PCB 52.

Figure 2:
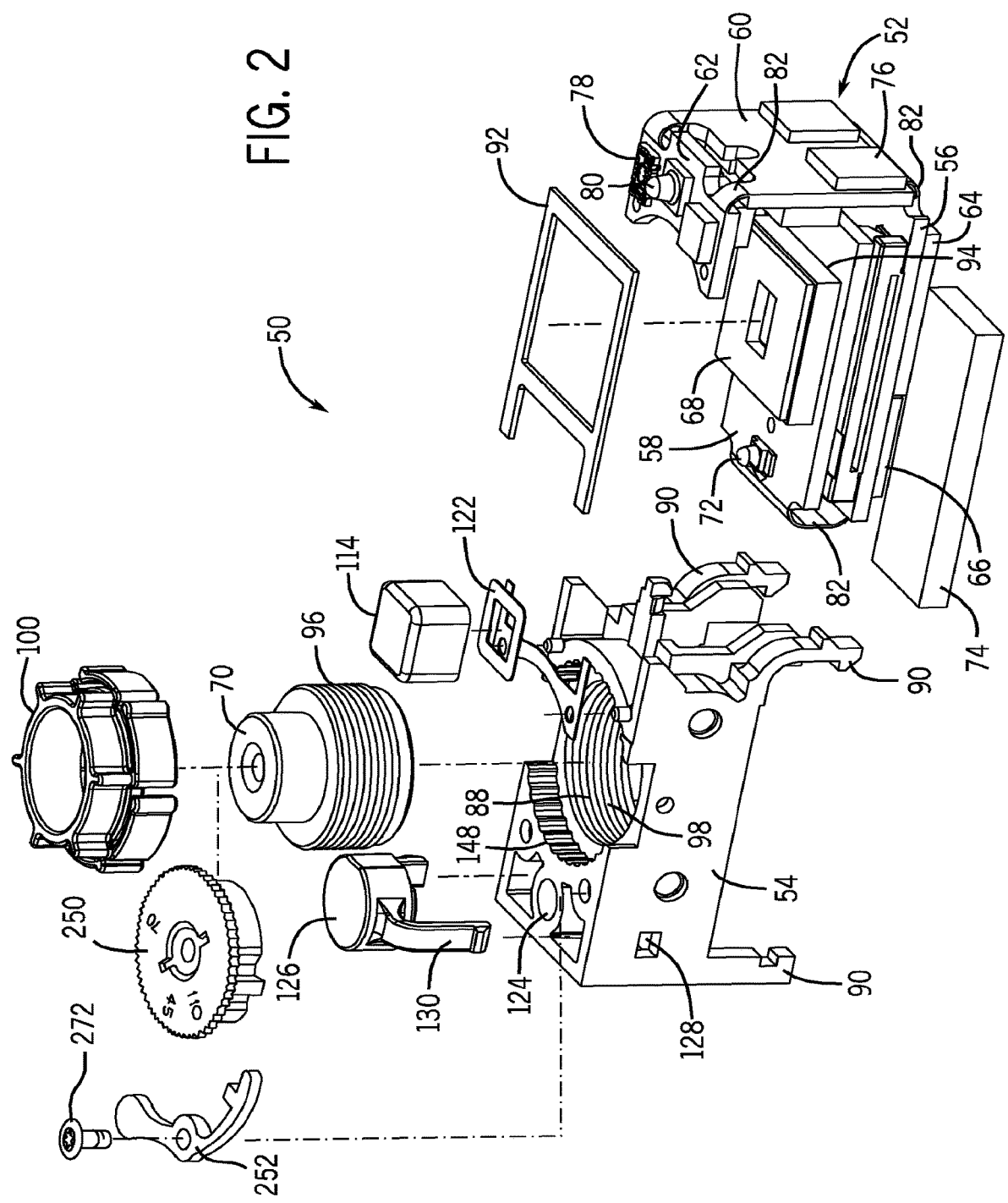
FIG. 2 is an exploded view of an electronic device in accordance with the present embodiments.

Referring now to FIG. 2, an exemplary imaging device 50 generally includes a rigid-flex PCB 52 and a carrier frame 54. The rigid-flex PCB 52 can comprise a variety of board configurations that include processing elements. In the embodiment shown in FIG. 2, the rigid-flex PCB can include a main board 56, a sensor board 58, a power and I/O board 60, and an illumination board 62. It is to be appreciated that any of these boards can be removed or replaced with other boards, and components discussed or shown in the Figures can be moved from one board to another. The specific board names are not to be limiting, and are merely named for simplicity and not to define a specific form or function.

The main board 56 can generally include a processor 64 used for image processing and decoding. The processor 64 can be encoded with software that is configured to, among other things, control illumination, acquire image data, and process the acquired image data into usable information. Image processing can include known operations including inspection, alignment, and measurements, as non-limiting examples. A memory medium 66 can also be included on the main board 56 for storing imaging software, images, and buffering data and the like.

The sensor board 58 can generally include a vision sensor 68. The vision sensor 68 serves to convert light entering through a lens 70 into electrons to create an image. The lens 70 focuses image data, i.e., reflected light from an image, onto the vision sensor 68. The lens 70 can be positioned over the vision sensor 68 on the sensor board 58 to provide a view of an object in the field of view (FOV) to the vision sensor 68. In order to protect the vision sensor 68 from dust and stray light, a sealant, such as a double adhesive sealing tape 92, can be used, for example, and can be positioned around the outer edge 94 of the vision sensor 68, and can be adhered to the sensor board. In some embodiments, a web of thermal insulator material 74 can be placed between components and/or boards to help reduce heat flow. For example, insulator material 74 can be positioned between the vision sensor 68 and the processor 64 to help reduce heat flow.

An aiming device 72, such as a known LED and/or laser diode can be included on the sensor board 58. The aiming device can provide an indication, e.g. a visual indication such as a dot or X, for example, of the center of the FOV of the imaging device 50. The aiming device 72 can be positioned on the sensor board 58, or any of the other boards, and the carrier frame 54 can include an aperture 124 to allow the LED beam or laser beam (not shown) to pass. An aimer lens 126 can be placed in front of or on top of the aiming device 72 to adjust the aimer output angle and/or uniformity, for example. The aimer lens 126 can be replaced by other types of lenses to meet different application requirements. The carrier frame 54 can include a recess 128 that can be used to secure the aimer lens 126 to the carrier frame 54. The aimer lens 126 can include one or more tabs or hold downs 130 that secure the aimer lens, and possibly the illumination board 62, to the carrier frame 54. In other embodiments, an adhesive tape or film can be used, alone or in combination with the hold downs 130, to secure the aimer lens 126 to the carrier frame 54.

The power and I/O board 60 can generally include power management circuitry 76 and analog and/or digital input and output (I/O) connector(s) 78 for a variety of optional devices and/or to couple to a communication network, for example. The illumination board 62 can also include I/O connector(s) 78, and can also include, among other things, an illumination device 80, e.g., an LED or LEDs, for object illumination. The illumination device 80 can be a known LED, for example. Similar to the aimer lens 126, in some embodiments, an illumination lens 114 can be placed in front of or on top of the illumination device 80 to adjust the light output angle and/or uniformity, for example. The illumination lens 114 can be replaced by other types of lenses to meet different illumination requirements. The illumination board 62 can be sized and shaped to include a recess 116 or other structure or fastener mechanism that can be used to secure the illumination lens 114 to the carrier frame 54. The illumination lens 114 can also be used to retain the illumination board 62 to the carrier frame 54. Similar to the aimer lens 126, in some embodiments, the illumination lens 114 can include one or more tabs or hold downs 120 that secure the illumination lens, and/or possibly the illumination board 62, to the carrier frame 54 (see FIG. 15). It is to be appreciated that the carrier frame 54 may also include a retention feature so as to allow the illumination lens 114 to be retained on the carrier frame 54. In other embodiments, an adhesive tape or film 122 can be used, alone or in combination with the hold downs 120, to secure the illumination lens 114 to the illumination board 62 and/or carrier frame.

The carrier frame 54 can be a molded, formed, and/or machined component, and can be sized and shaped so as to provide a support structure for some or all of the boards 56, 58, 60, and 62, and for supporting one or more optics and/or additional imaging device components as discussed below. The carrier frame 54 can also include a plurality of PCB restraints 90. In the embodiment shown, the carrier frame 54 includes four PCB restraints 90 (the left rear PCB restraint is hidden from view), although more or less can be used. Six PCB restraints 90 are used in FIG. 11. As shown in FIGS. 1 and 2, for example, the PCB restraints 90 can be biased to provide a snap-fit for any of the boards. As can be seen, the main board 56, the sensor board 58, the power and I/O board 60, and/or the illumination board 62 can be held in place on, in, and/or around the carrier frame 54 using the PCB restraints 90, and/or the carrier frame itself.

Traditional imaging devices include a lens that is factory calibrated for a specific focal distance, and without the option for user adjustment. Different focal distances required a different imaging device. Other traditional imaging devices provide some lens adjustment capability, but require tools and disassembly of the imaging device, even for small or minor fine tuning adjustments. To overcome these limitations, the carrier frame 54 can include an aperture 88 sized to support the main imaging lens 70. The aperture 88 can be threaded to allow the lens 70 to be replaced and/or rotated to adjust the lens focus. This provides the ability to focus the imaging device by adjusting the lens 70 instead of moving the imaging device 50. In some embodiments, the lens 70 can include a threaded base 96, and the carrier frame 54 can include mating threads 98 in the aperture 88 to support the lens, and to allow the lens 70 to be rotated to adjust a distance between the lens 70 and the vision sensor 68 for focusing. In some applications, the lens can be secured with a lens focus fix 100 to restrain the lens from rotating on its own.

Imaging devices, when used in a manufacturing assembly, test, measurement, automation, and/or control application, for example, can be subject to harsh operating environments including vibrations and temperature variations that can cause thermal expansion and contraction. These environmental factors can cause the lens to rotate on its own, which can eventually cause the lens to get out of focus, possibly causing unsatisfactory results. The lens focus fix 100 can not only serve to restrain the lens 70 from rotation in these harsh environments, but in some embodiments, the lens focus fix 100 can also allow adjustment of the lens 70 without the use of tools, while at the same time restraining the lens.

Figure 3:
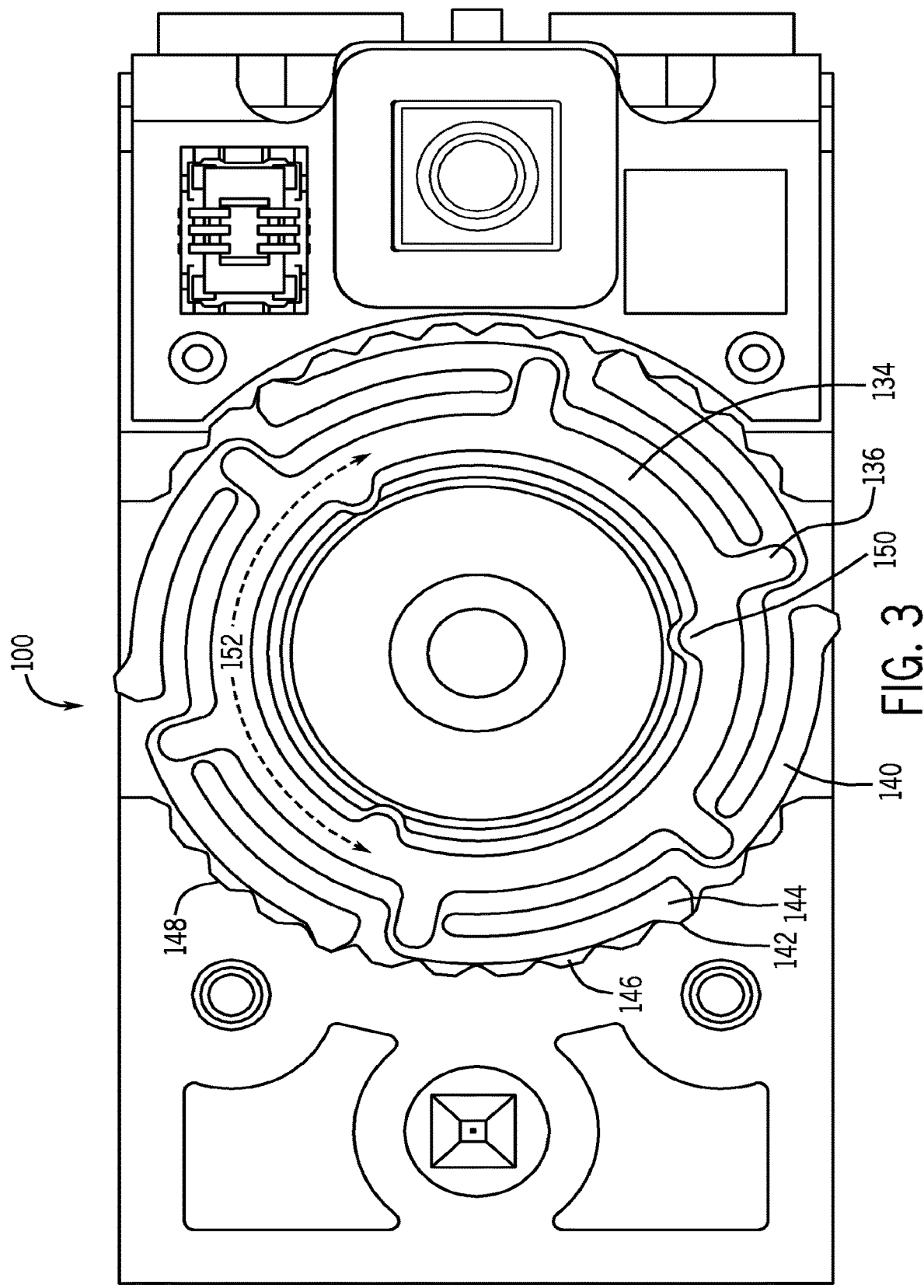
FIG. 3 is a plan view of the electronic device as seen in FIG. 1, and showing an embodiment of a lens focus fix.
Figure 4:
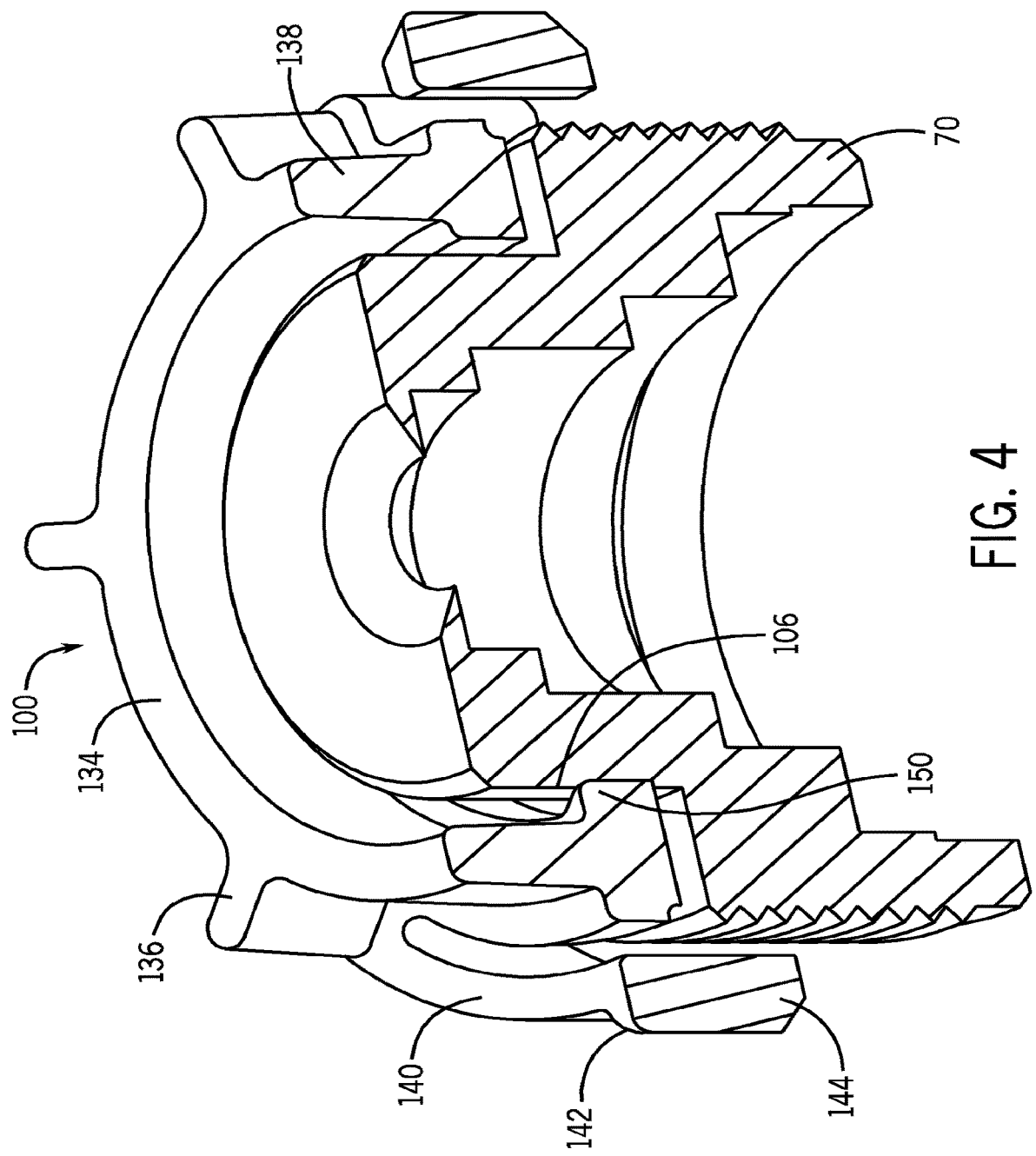
FIG. 4 is a perspective view in section of the lens focus fix as seen in FIG. 1.

Referring to FIGS. 3 and 4, the lens focus fix 100 can be a formed fit and snapped or pressed into place by a user to restrain the lens 70, and can be rotated to provide discrete steps of lens adjustment to adjust the focal position of the lens 70, all without the use of tools. In some embodiments, the lens focus fix 100 can comprise a base 134, a ratchet portion 136, and a lens retainer portion 138. In some embodiments, the ratchet portion 136 can include at least one ratchet arm 140 extending from the base 134. The ratchet arm 140 can include a protrusion 142 extending from an engagement end 144 of the ratchet arm 140. The protrusion 142 can be sized and configured to engage a mating engagement apparatus 146, such as one of a plurality of recesses 146 positioned about a recessed rim 148 of the aperture 88. The ratchet arm 140 can apply a radially extending force such that the engagement end 144 is biased toward the mating engagement apparatus 146. As shown, the lens focus fix 100 includes six ratchet arms 140, although more or less are contemplated. Each protrusion 142 and recess 146 provides a discrete focal position for the lens 70. In some embodiments, the recessed rim 148 can include a cutout 150 where a ratchet arm 140 and associated protrusion 142 does not contact a recession 146. It is to be appreciated that other latching mechanisms may be used, including where the rim 148 can include protrusions 142 and the engagement end 144 can include a recess 146, for example.

The lens retainer portion 138 can contact and engage a barrel 106 of the lens, either partially or substantially surrounding the barrel 106. As shown in FIG. 3, the retainer portion 138 can include an engagement portion 150, such as a plurality of ribs 150 to contact and engage the barrel 106 and keep the lens 70 from rotating. Three ribs 150 are shown, although more or less ribs are contemplated.

In use, a user can install and provide an adjustment for a lens 70 by rotating the threaded lens 70 within the threaded aperture 88. The user can then position the lens focus fix 100 over the lens 70 and insert the lens focus fix 100 into the recessed rim 148 and over the lens barrel 106. The lens 70 is now restrained from rotating on its own. To provide a fine-tuned focal adjustment for discrete focal positions, the user can grip the ratchet portion 136 and rotate the ratchet portion, in either a clockwise direction or a counter clockwise direction 152, to discretely adjust the focal position for the lens 70. The ratchet arms 140 and associated recesses 146 serve to provide the discrete adjustment positions, while the lens retainer portion 138 restrains the position of the lens in relation to the lens focus fix 100. For example, when the lens focus fix 100 is rotated a distance in a first direction, the lens retainer portion 138 causes the lens 70 to also rotate a distance in the first direction along with the lens focus fix 100. The rotational distance of the lens focus fix 100 and the lens 70 can be the same, or gearing could be included, for example, to step up or step down the rotational distance of the lens 70.

Figure 5:
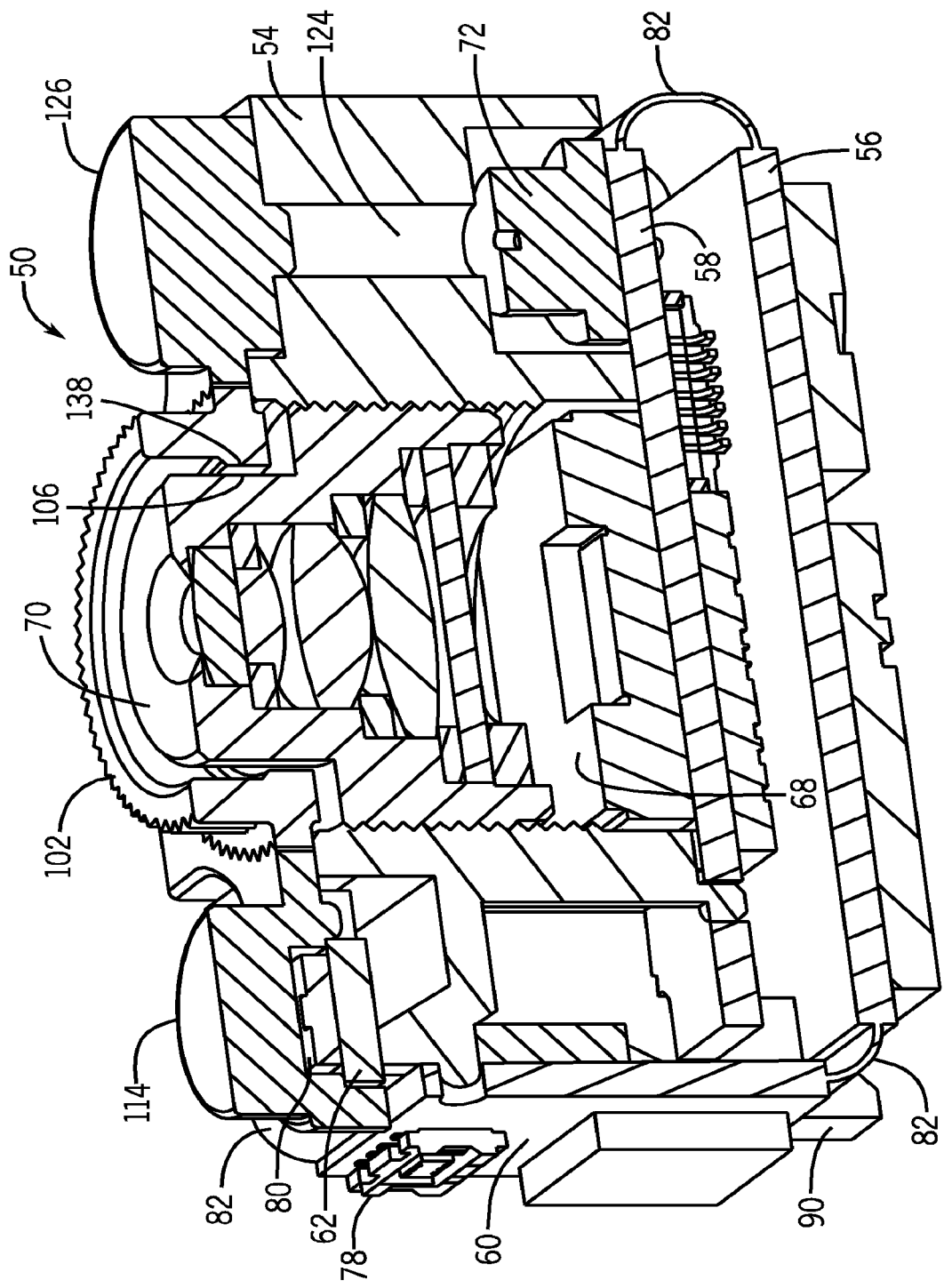
FIG. 5 is a perspective view in section of an electronic device in accordance with the present embodiments and showing an alternative embodiment of a lens focus fix.

Referring to FIG. 5, in some embodiments, the lens focus fix can comprise a lens focus fix ring 102, and can be positioned over the lens 70 to secure the lens in a desired focal position and keep the lens from rotating. Similar to the lens focus fix 100, the lens focus fix ring 102 can be positioned over the lens 70 and inserted into the recessed rim 148 and over the lens barrel 106. The lens 70 is now restrained from rotating on its own. To provide a fine tuned focal adjustment, the user can remove the lens focus fix ring 102, rotate the threaded lens 70 within the threaded aperture 88, in either a clockwise direction or a counter clockwise direction, to adjust the focal position for the lens 70. The user can then reposition the lens focus fix ring 102 over the lens 70 and insert the lens focus fix ring 102 into the recessed rim 148 and over the lens barrel 106. The lens focus fix ring 102 can also include a retainer portion 138 to keep the lens 70 from rotating. The retainer portion 138 can contact and engage the barrel 106 of the lens 70, either partially or substantially surrounding the barrel 106.

Figure 6:
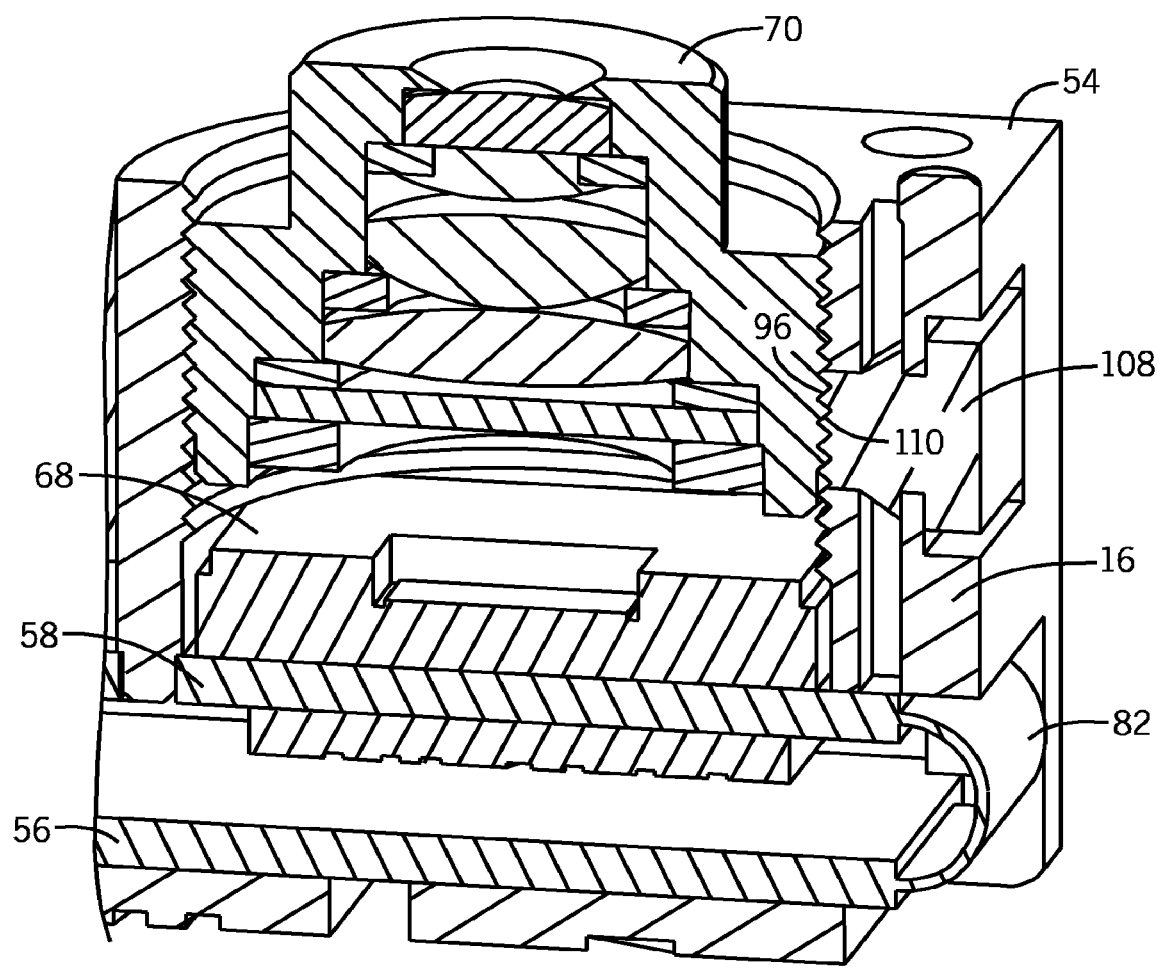
FIG. 6 is a perspective view in section of a portion of an electronic device in accordance with the present embodiments and showing an alternative embodiment of a lens focus fix.

Referring to FIG. 6, in other embodiments, the lens focus fix can comprise a lens focus fix plug 108, and can be positioned on or within the carrier frame 54. The lens focus fix plug 108 can include a contact portion 110. The contact portion 110 can be threaded to engage the threaded base 96 on the lens 70, and/or the contact portion 110 can be a generally soft material, e.g., plastic or rubber, to engage the lens 70 and keep the lens from rotating. In some embodiments, both a lens focus fix 100, or lens focus fix ring 102, and the lens focus fix plug 108 can be used.

Figure 7:
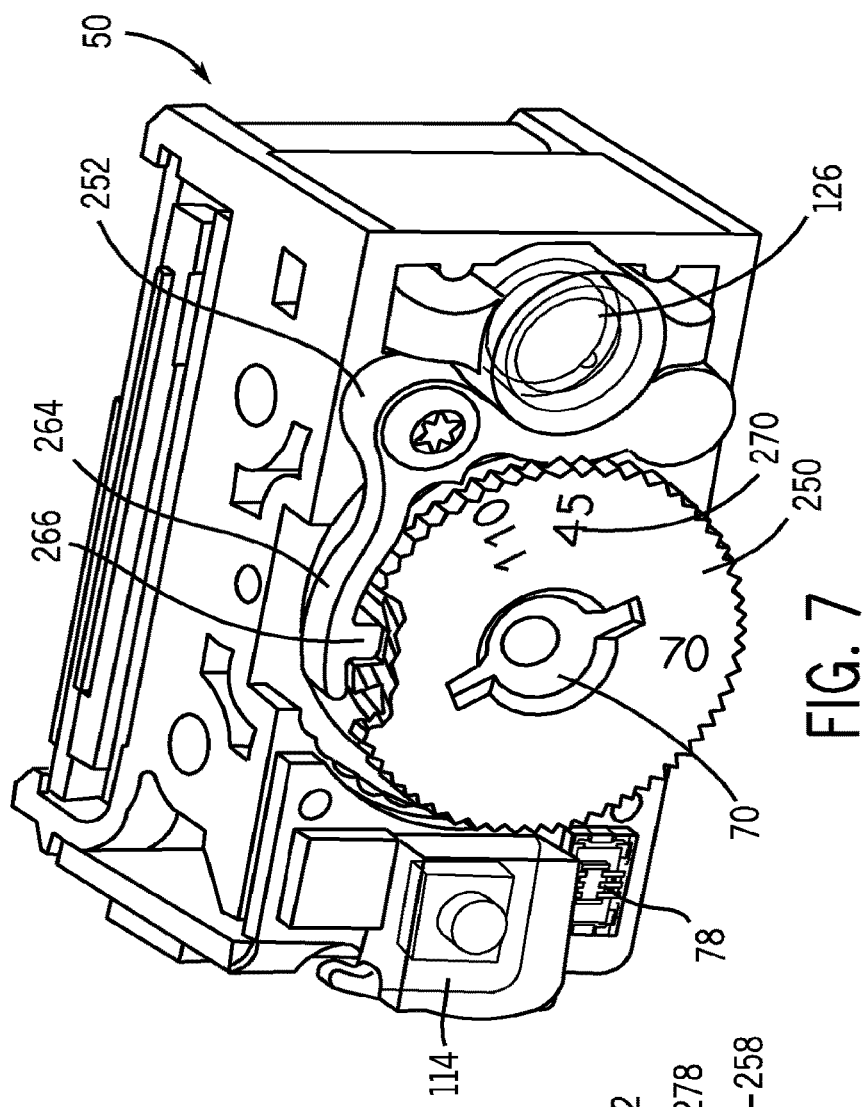
FIG. 7 is a perspective view of an electronic device in accordance with the present embodiments and showing
Figure 8:
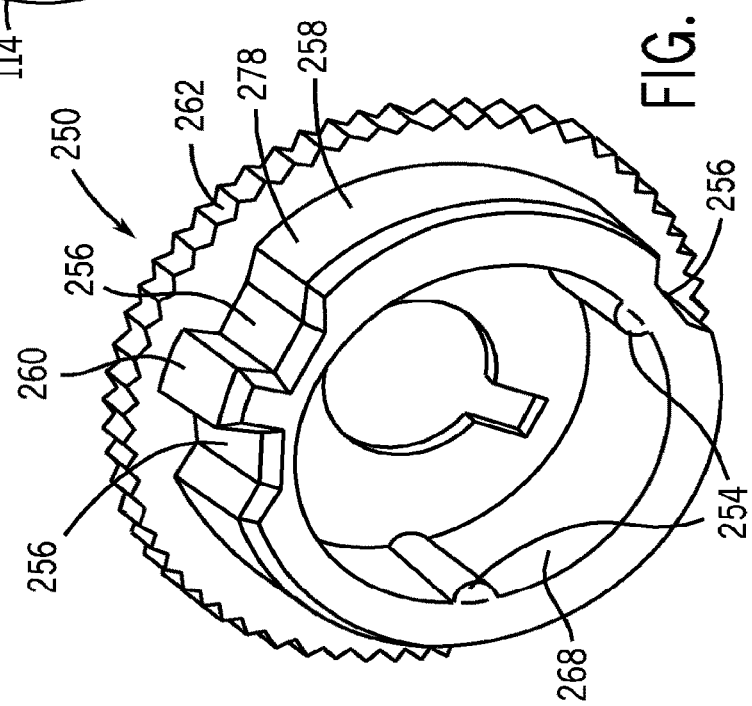
FIG. 8 is a perspective view of an embodiment of the lens focus fix as seen in FIG. 7.

Referring to FIGS. 7 and 8, an alternative embodiment of a lens focus fix 250 is shown. Similar to the lens focus fix 100, the lens focus fix 250 can be a formed fit and snapped or pressed into place by a user to restrain the lens 70. The lens focus fix 250 can be rotated to provide discrete steps of lens adjustment to adjust the focal position of the lens 70, all without the use of tools. In some embodiments, the lens focus fix 250 can include a slot 274 to allow a tool, e.g., a screwdriver or similar device, to rotate the lens focus fix. The lens focus fix 250 along with a restraint 252 can provide a predetermined number of fixed focal positions that can be achieved by rotation of the lens focus fix 250.

In some embodiments, the lens focus fix 250 can comprise a base 262, a ratchet portion 258, and a lens retainer portion 268. The base 262 can be grasped by a user to rotate the lens focus fix 250. A side wall 278 of the ratchet portion 258 can include a predetermined number of engagement apparatus 256 and at least one stop protrusion 260. Each engagement apparatus 256, such as one of a plurality of recesses 256, in cooperation with the restraint 252, can provide a discrete focal position for the lens 70. The stop protrusion 260 can be sized and configured to prevent a turn of the lens focus fix 250 over a predetermined amount of degrees (e.g., 180 or 270 degrees, or more or less).

Figure 9:
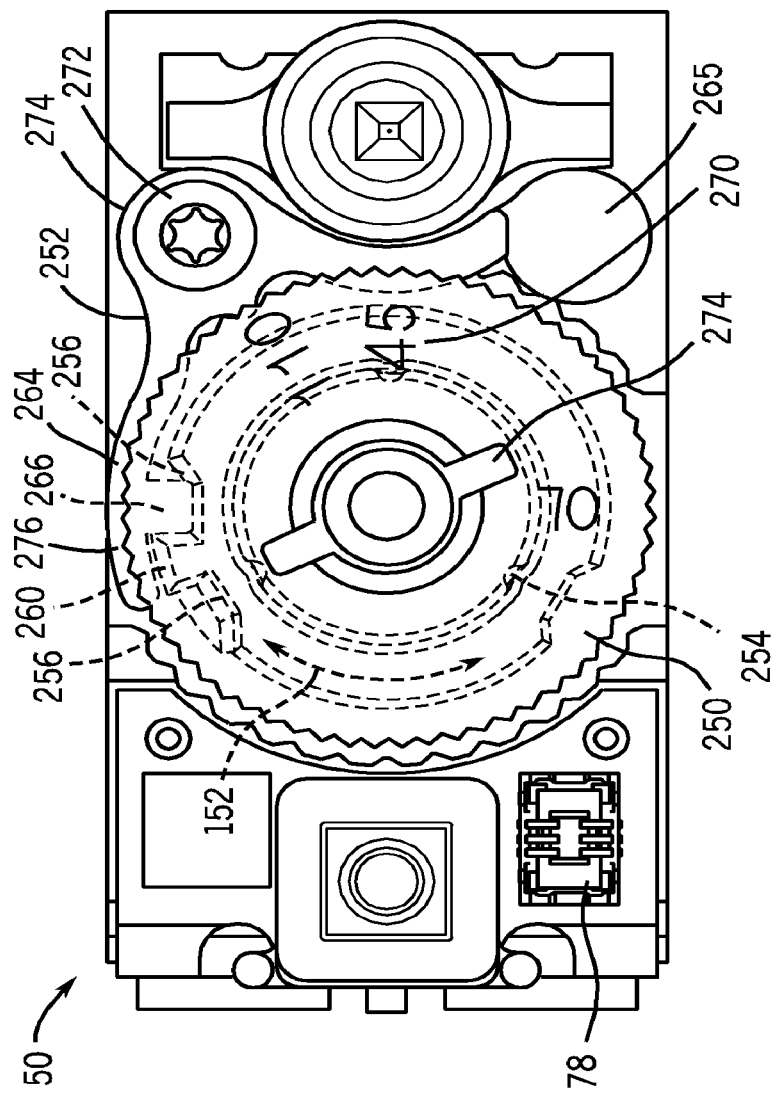
FIG. 9 is a plan view of the electronic device as seen in FIG. 1, and showing an embodiment of a lens focus fix.

Referring to FIG. 9, the restraint 252 can be secured to the carrier frame 54 by a variety of means, such as a rivet or screw 272. The restraint 252 can include a ratchet arm 264 and a biasing arm 265 extending from a base 274. The ratchet arm 264 can include a protrusion 266 extending from an engagement end 276 of the ratchet arm 264. The protrusion 266 can be sized and configured to engage one of the plurality of recesses 256 positioned about the ratchet portion 258. The ratchet arm 264 can apply a force, such as a radially extending compression force, such that the engagement end 276 is biased toward a mating recess 256. As shown, the lens focus fix 250 includes three recesses 256, although more or less are contemplated. Each recess 256 provides a discrete focal position for the lens 70, such that the protrusion 266 snap locks into place into one of the recesses 256. By turning the lens focus fix 250, the protrusion 266 can be unlocked from the recess 256 and find the next recess 256 and relock. In some embodiments, each recess 256 can have an associated visual indicator 270 that indicates the focal position. It is to be appreciated that other latching mechanisms may be used, including where the ratchet portion 258 can include protrusions 266 and the engagement end 276 can include a recess 256, for example.

The lens retainer portion 268 can contact and engage the barrel 106 of the lens 70, either partially or substantially surrounding the barrel 106. As best seen in FIGS. 8 and 9, the retainer portion 138 can include an engagement portion 254, such as a plurality of ribs 254 to contact and engage the barrel 106 and keep the lens 70 from rotating. Three ribs 254 are shown, although more or less ribs are contemplated.

To provide a fine-tuned focal adjustment for discrete focal positions, the user can grip and rotate the base 262, in either a clockwise direction or a counter clockwise direction 152, to discretely adjust the focal position for the lens 70. The protrusion 266 and associated recesses 256 serve to provide the discrete adjustment positions, while the lens retainer portion 268 restrains the position of the lens 70 in relation to the lens focus fix 250. For example, when the lens focus fix 250 is rotated a distance in a first direction, the lens retainer portion 268 causes the lens 70 to also rotate a distance in the first direction along with the lens focus fix 250. The rotational distance of the lens focus fix 250 and the lens 70 can be the same, or gearing could be included, for example, to step up or step down the rotational distance of the lens 70. In FIG. 9, the lens focus fix 250 would only be rotatable in a counter clockwise direction because the stop protrusion 260 is restricting rotation of the lens focus fix 250 in the clockwise direction.

Figure 10:
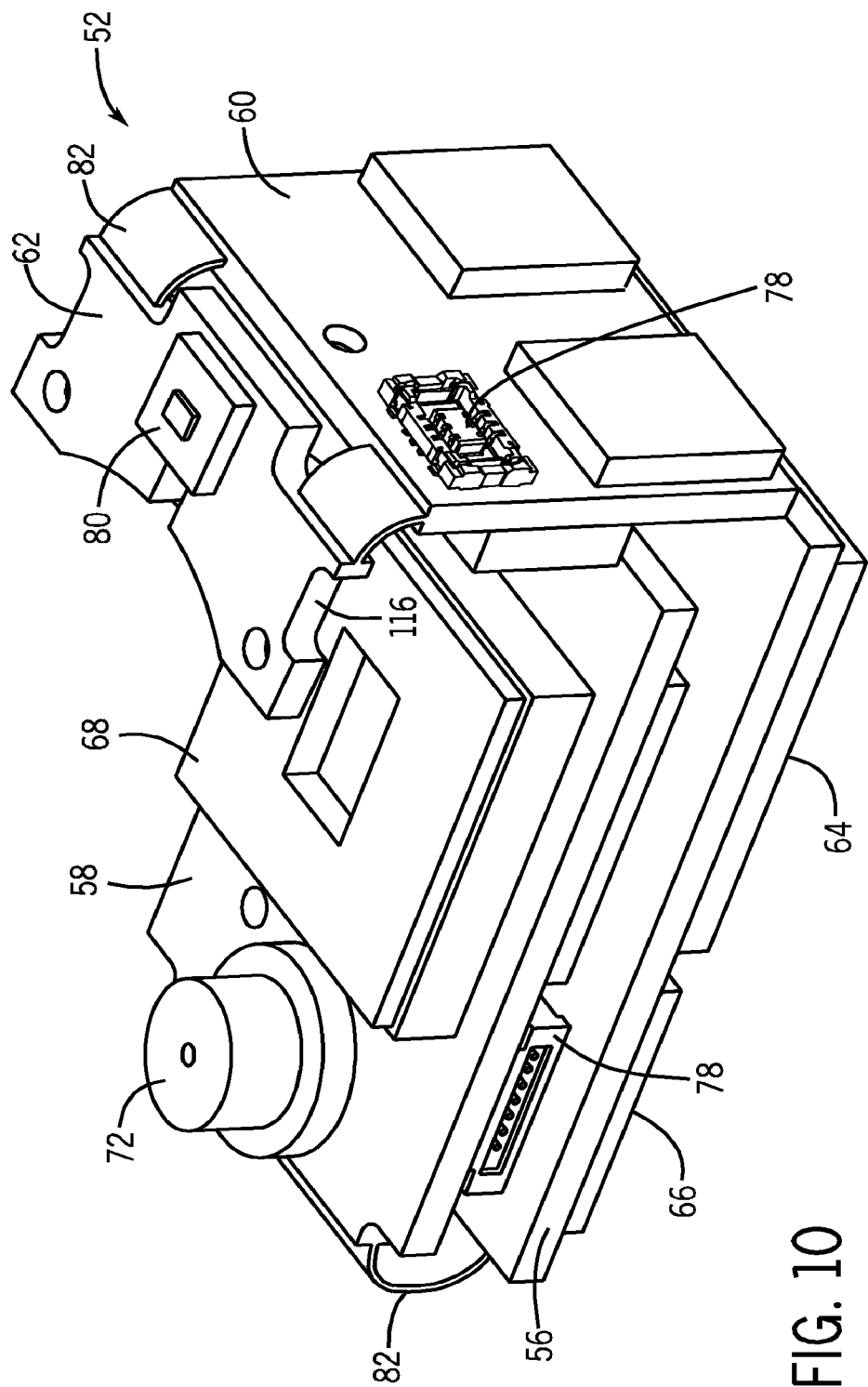
FIG. 10 is a perspective view of an electronic device in accordance with the present embodiments and showing the carrier frame and vision sensor lens removed.

Referring to FIG. 10, in some embodiments, each board 56, 58, 60, and 62 can be of a generally rigid PCB construction with flexible PCB 82 coupling one or more of the rigid boards together, described herein as a rigid-flex PCB. It is to be appreciated that flexible PCB may also be used in whole or in part. In one embodiment, the sensor board 58 can be positioned above and coupled to the main board 56 with flexible PCB 82. This orientation allows the vision sensor 68 to be positioned such that the lens 70 can be positioned above the vision sensor. The power and I/O board 60 can be coupled to the main board 56 with flexible PCB 82, and can extend upward toward the face 84 of the imaging device (see FIG. 11). The power and I/O board 60 can also be coupled to the sensor board 58, for example, instead of the main board 56. The illumination board 62 can then be coupled to the power and I/O board with flexible PCB 82. The illumination board 62 can also be coupled to the sensor board 58, for example.

Figure 11:
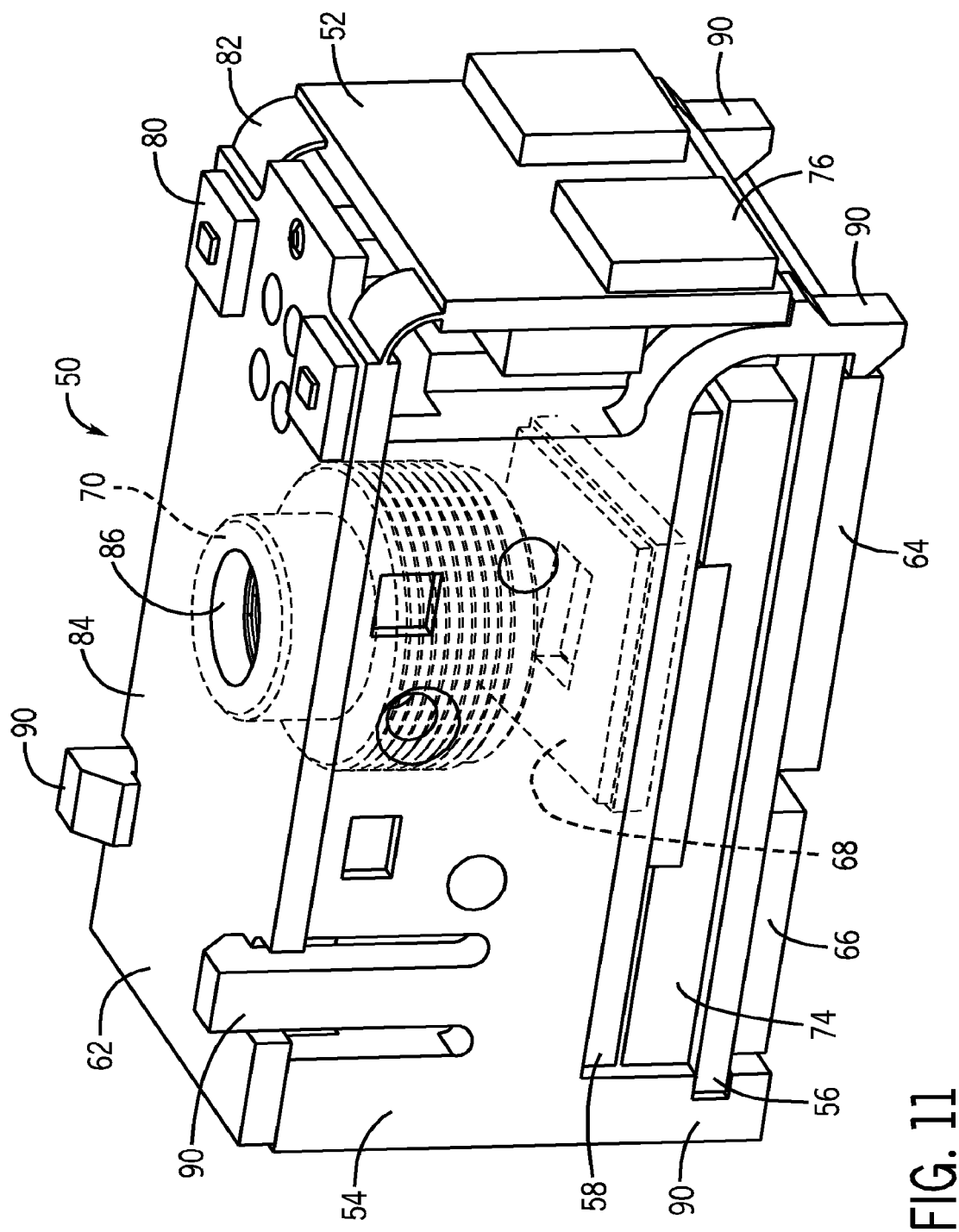
FIG. 11 is a perspective view of an optional configuration of an electronic device, showing one portion of a rigid-flex PCB covering a substantial portion of the carrier frame face and overlapping the vision sensor lens, in accordance with the present embodiments.

Referring to FIG. 11, in some embodiments, the illumination board 62 can extend and cover some or a substantial portion of the face 84 of the imaging device 50. In this embodiment, the extended illumination board 62 can cover a portion of the lens 70, leaving only an aperture 86 through the illumination board 62 sized to allow sufficient light to enter the lens 70 as needed.

Figure 12:
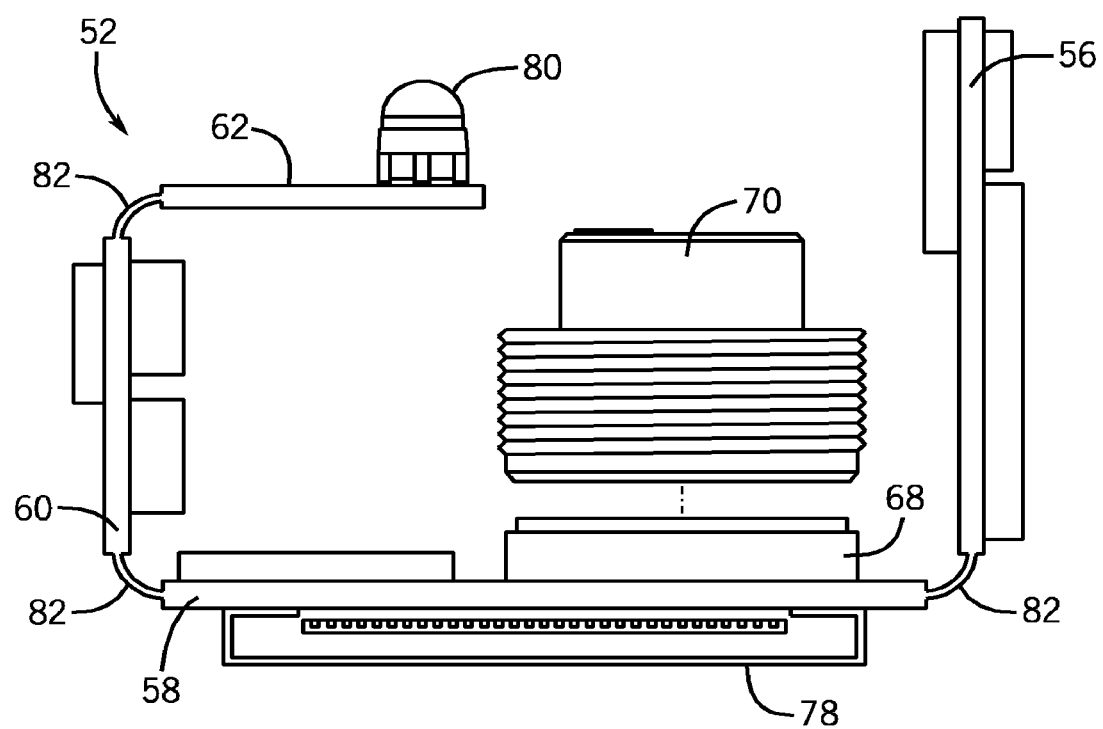
FIGS. 12-14 are views showing alternative configurations of the rigid-flex PCB bent around and supported by the carrier frame, in accordance with the present embodiments.
Figure 13:
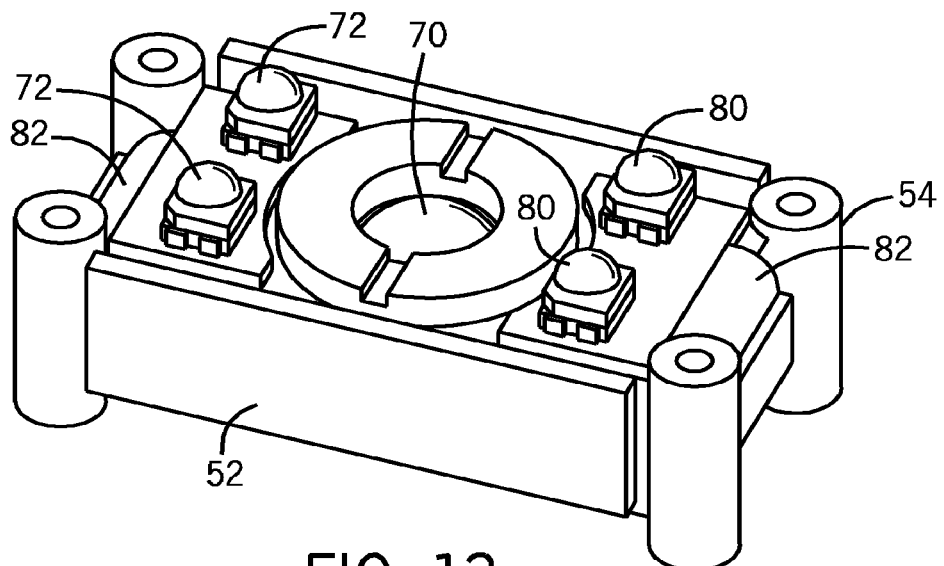
Figure 14:
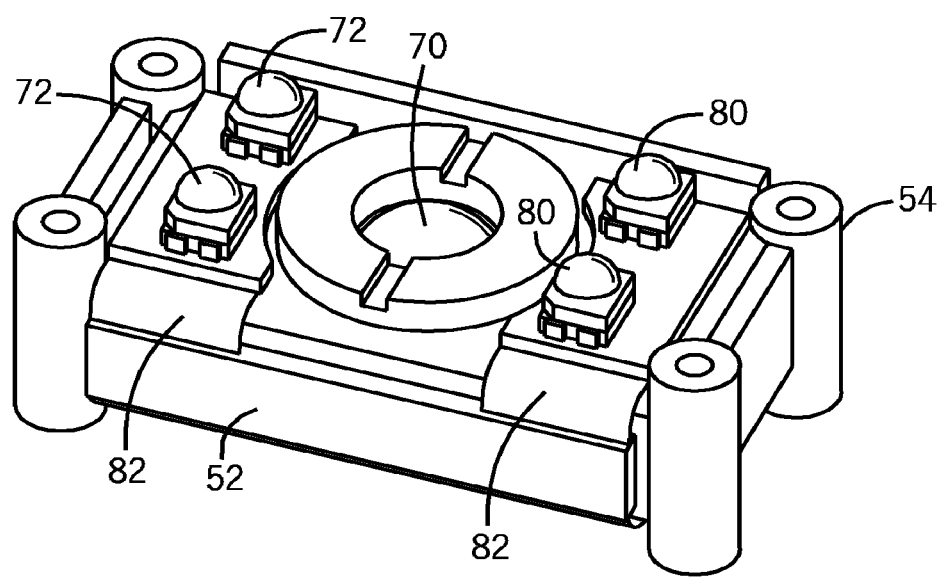

FIGS. 12-14 show alternative embodiments where the rigid-flex PCB 52 can be positioned around the carrier frame 54 in a variety of different ways. In FIG. 12, the carrier frame has been removed to better show possible rigid-flex PCB orientations. In FIG. 12, for example, the main board 56 is positioned on an opposite side of the imaging device from the power and I/O board 60. In FIGS. 13 and 14, alternative board configurations are show where aiming devices 72 and/or illumination devices 80 can be positioned on one or more boards, e.g., on a board(s) that surrounds and/or can be positioned next to or near the lens 70. In addition, the flexible PCB 82 can extend from any side of the various PCBs to meet any size or shape constraints, and/or various carrier frame 54 configurations.

Figure 15:
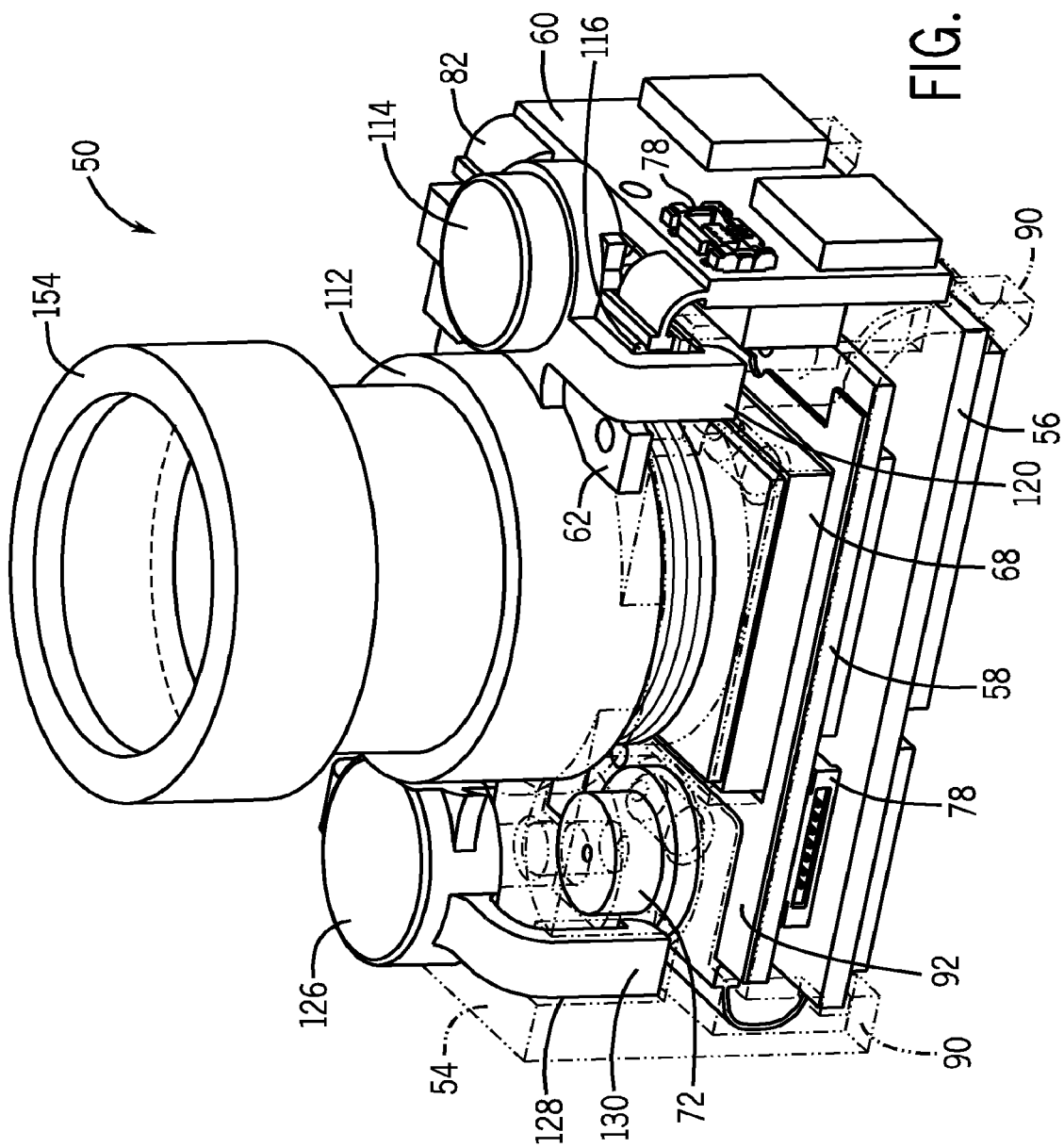
FIG. 15 is a perspective view of an electronic device in accordance with the present embodiments and showing optional components coupled to the carrier frame and/or rigid-flex PCB.

Referring to FIG. 15, to support different lenses 154, a lens extender 112 can be coupled or mounted to the carrier frame 54, or can be a part of the carrier frame. The lens extender 112 can be internally and/or externally threaded so it can be threaded to the carrier frame 54, and allow a variety of different lenses, such as lens 154, to be threaded to the lens extender 112. In this way, different lenses having different focal points and/or imaging characteristics, for example, can be mounted to the imaging device 50, thereby increasing the applications for which it can be used.

In some applications, the distance between the vision sensor 68 and an object to be imaged may vary between uses. In these cases, in order to obtain useful images (i.e., images from which data required to complete imaging processes can be extracted), an adjustable lens and auto-focus system can be provided. In these cases, when the imaging device is activated to perform a vision process, the lens and auto-focus system can automatically focus the lens so that a clear image of the object to be imaged can be generated on the vision sensor, and can be processed to complete the imaging process.

Figure 16:
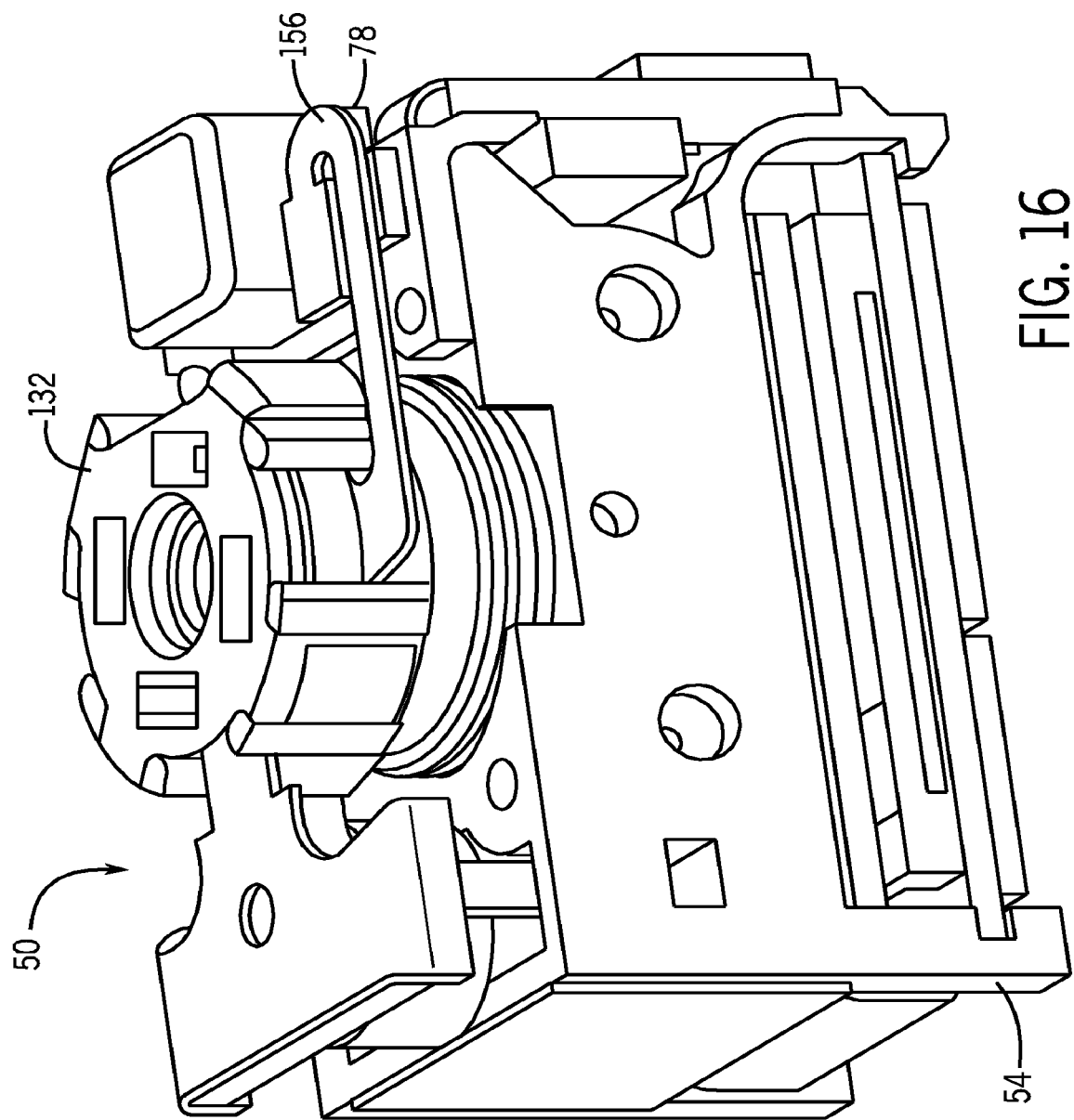
FIG. 16 is a perspective view of an optional configuration of an electronic device, the electronic device including a liquid lens arrangement.

Referring to FIG. 16, one type of lens that can be used with the imaging device is a liquid lens 132. Liquid lenses can be constructed of one or more fluids of different refractive indexes, and can be varied by controlling the meniscus, or surface of the liquid. In one type of liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens which can be adjusted by applying a DC voltage across the coating to decrease its water repellency in a process called electrowetting. Electrowetting adjusts the surface tension of the liquid changing the radius of curvature and adjusting the focal length of the lens.

Liquid lenses are extremely versatile, providing a highly variable focal length, without the need for moving parts. The imaging device 50 can support a liquid lens 132 and can be connected to the imaging device via a flex connector 156 coupled to connector 78 on the illumination board 62, for example, or connector 156 could be connected to a flex part 82 of the rigid-flex PCB 52, for example.

Traditional imaging devices are physically coupled using a communication cable to a computer or similar device that includes sufficient processing power. The traditional imaging device is used to acquire an image, and the image is then uploaded to the computer for image decoding. In this way, the traditional imaging device only includes enough processing power to acquire and transfer the image, with the processing intensive activities taking place on the computer where space and heat generation can be more easily managed. As is known, processors that run process intensive activities, such as image decoding, can be large in size and can produce a significant amount of heat as a byproduct of the processing activities.

In some embodiments, processor 64 can be sized and configured to process an image, as compared to transferring the image to a computer for processing. This processing of the image on the imaging device 50 can produce significant heat and can also require additional PCB space for a physically larger processor. In addition, with processing taking place on the imaging device 50, more signals can be generated that need to be transferred between components. Use of the rigid-flex PCBs 52 can reduce and/or eliminate additional connectors between traditional rigid circuit boards that require connectors to couple two or more rigid circuit boards together.

As previously discussed, in order to optimize the heat dissipation, embodiments can include some or all heat producing components placed on the rigid-flex PCBs 52 to be facing to the outside of the imaging device 50 to help radiate heat away from the imaging device. In some embodiments, the processor 64 and the vision sensor 68 can be on different boards comprising the rigid-flex PCB 52 so as to separate the heat producing processor 64 from the heat sensitive vision sensor 68.

Figure 17:
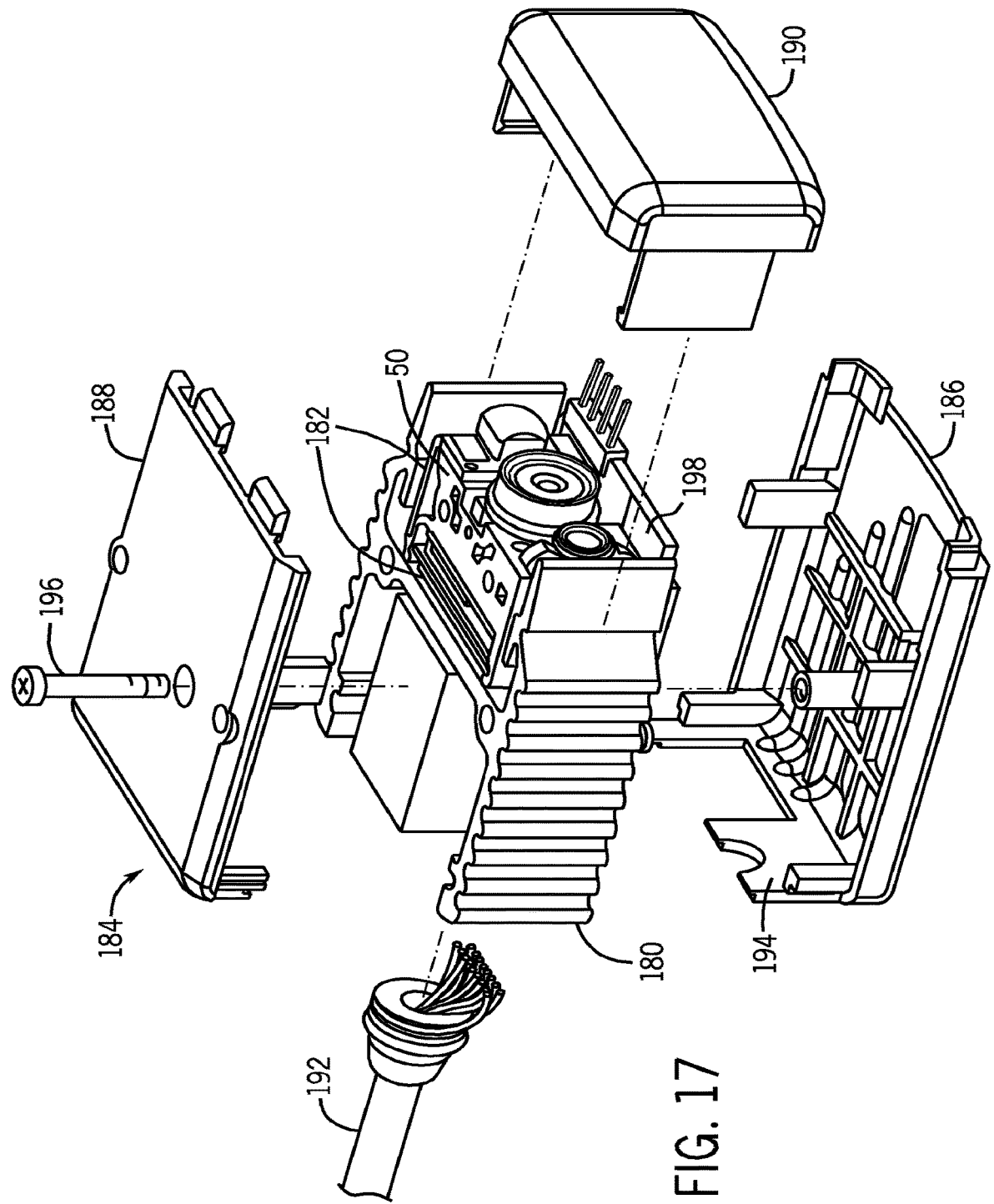
FIG. 17 is a partially exploded perspective view of an electronic device positioned within an enclosure, the enclosure including a heat sink thermally coupled to the electronic device to draw heat away from the electronic device.

In other embodiments, one or more heat sinks 180 can be thermally coupled to the imaging device 50 to dissipate heat to the environment. FIG. 17 shows a bottom view of the imaging device 50, where an enclosure 184, or portions of the enclosure 184, can serve as the heat sink 180, while in other embodiments, heat sink(s) 184 can be thermally coupled to components of the imaging device 50, and then placed inside a separate enclosure, for example. A thermal gap filler 182 can be used, as is known, to couple the processor 64, for example, or other devices on the rigid-flex PCB 52, to the heat sink 180. The heat sink 180 can be made of known heat sink materials, such as copper and/or aluminum, for example. The enclosure 184 can be made of plastic materials, for example.

Figure 18:
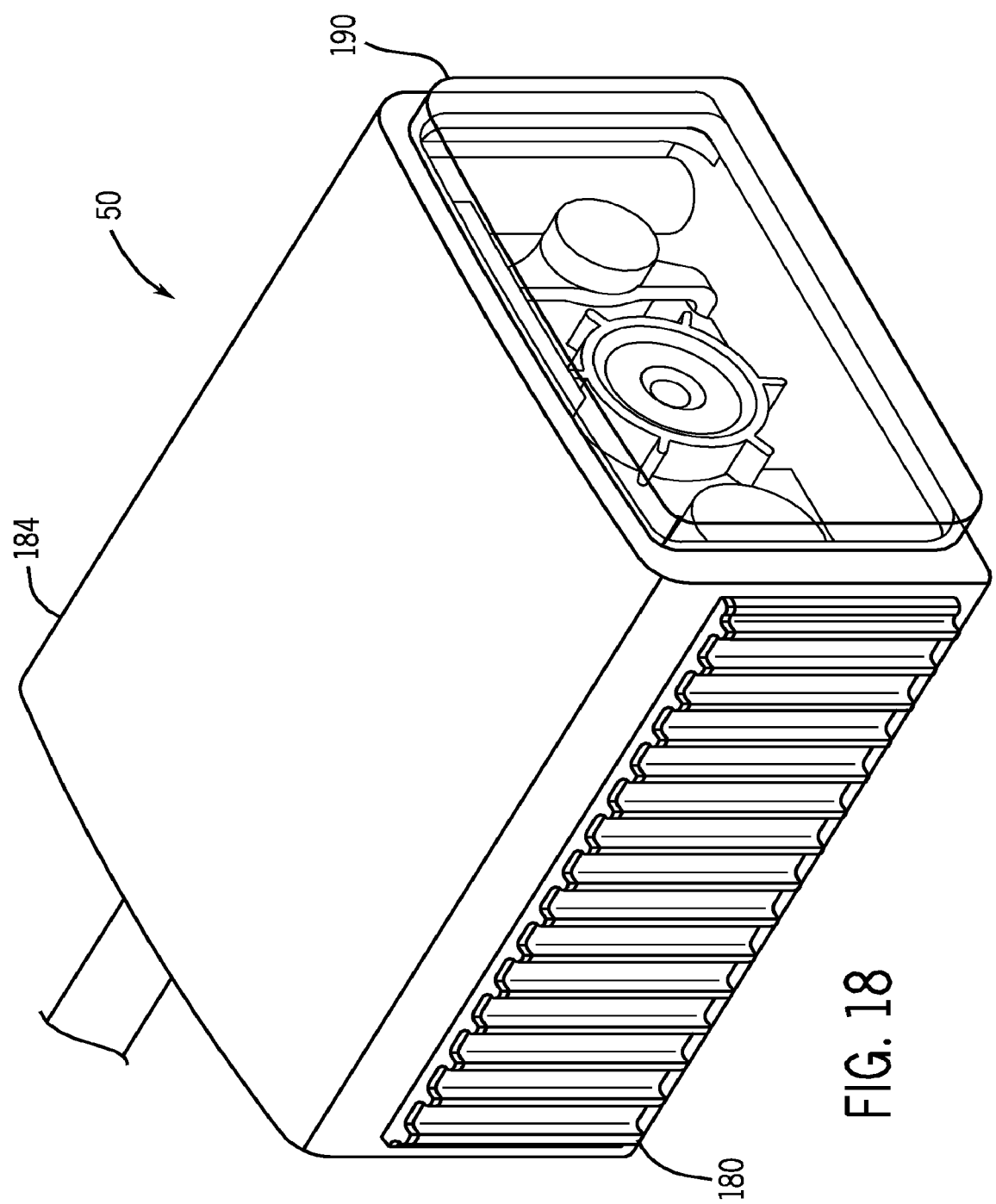
FIG. 18 is a perspective view of the electronic device positioned within the enclosure, as seen in FIG. 17.

In the embodiment of FIG. 17, three sides of the imaging device 50 are shown to be thermally coupled to the heat sink 180. It is to be appreciated that the heat sink 180 can be configured to thermally couple to more or less that the three sides, and in some embodiments, the heat sink 180 can be thermally isolated from one or more sides of the imaging device 50. The enclosure 184 is shown to include a top portion 186, a bottom portion 188, a front cover 190, and the heat sink 180 serving as side walls of the enclosure 184. In some embodiments, one or more I/O and/or communication cables 192 can extend though a rear wall 194 and couple to an input/output board 198 that is coupled to the imaging device 50. The top portion 186, bottom portion 188, heat sink 180, and front cover 190 can be assembled and secured together using screws 196, for example. The front cover 190 can be a snap fit to allow removal without tools to access the lens focus fix 100 and lens focus fix ring 102 for adjustment of the lens 70. FIG. 18 illustrates imaging device 50 within enclosure 184.

Figure 19:
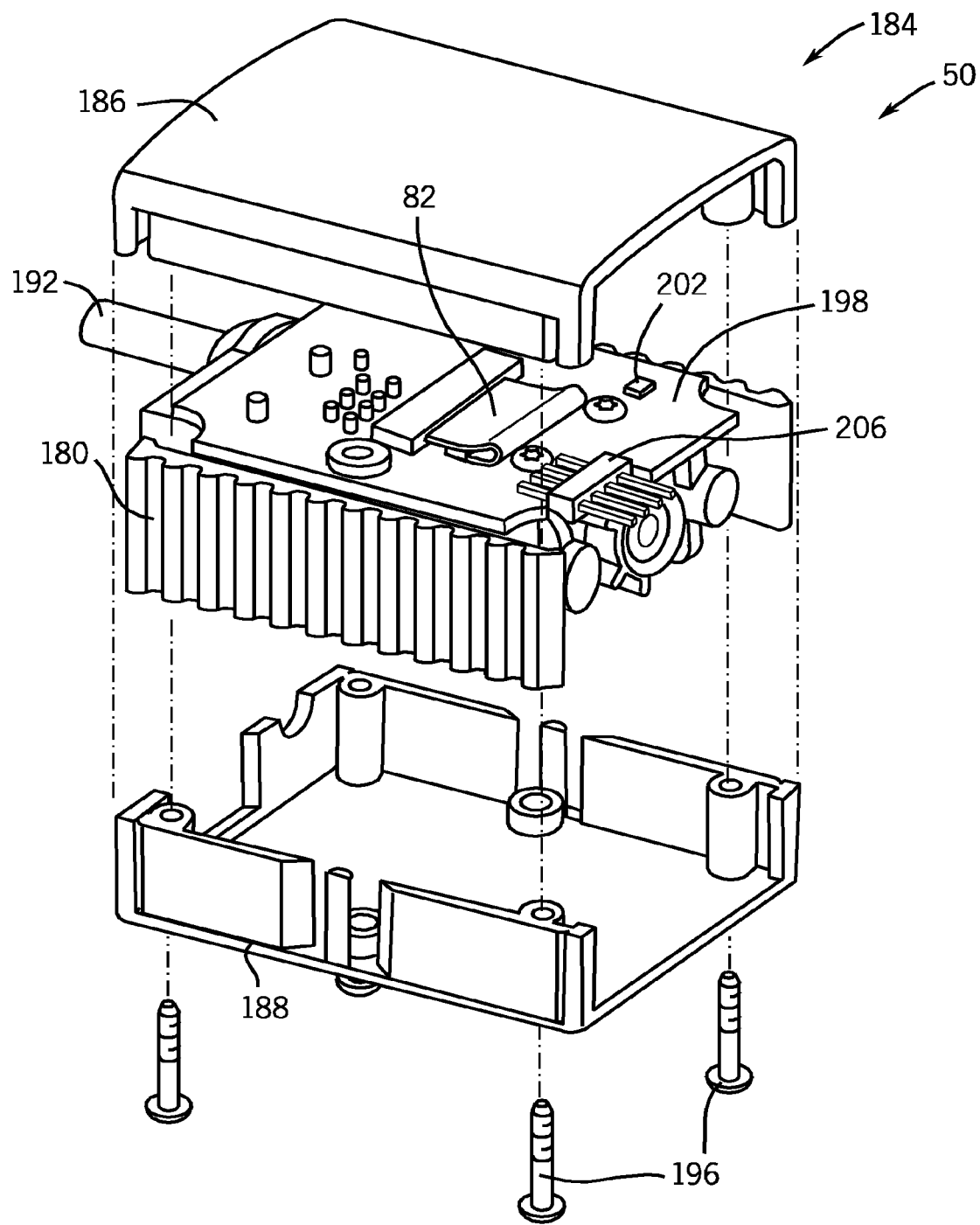
FIG. 19 is a partially exploded perspective view of an electronic device positioned within an enclosure, and showing an input/output board.
Figure 20:
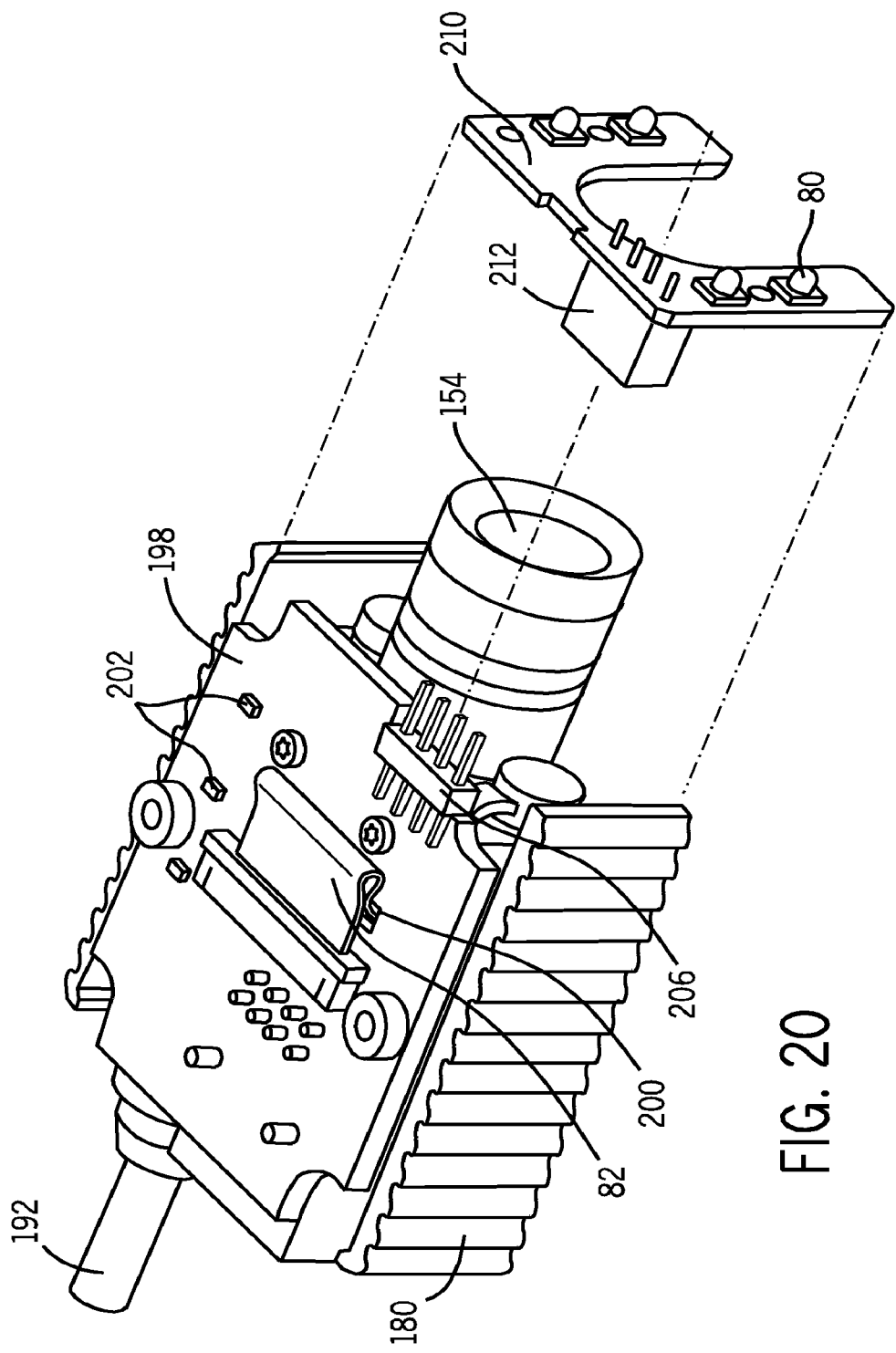
FIG. 20 is a perspective view of the electronic device shown in FIG. 19, and showing the input/output board including a connector coupleable to an illumination device.

Referring to FIGS. 19-21, a top view of the imaging device 50 and associated enclosure 184 is shown. In FIGS. 19 and 20, the input/output board 198 is better seen, and is shown coupled to the imaging device using flexible PCB 82. In some embodiments, the flexible PCB 82 can extend through a slot 200 in the input/output board 198. The input/output board 198 can be coupled to the heat sink 180 and/or the housing 184, and can include one or more indicators, such as LEDs 202, as a user interface.

The input/output board 198 can include a connector 206, such as a known board-to-board connector, to allow the imaging device 50 to control an additional illumination device. For example, as best seen in FIG. 20, an illumination device 210 having at least one illumination device 81 and a mating connector 212 can couple to the connector 206. In some embodiments, the illumination device 210 can be part of a packaged product or unit 216, as shown in FIG. 21. In other embodiments, the illumination device 210 can be a remote illumination device, e.g., not part of a packaged product or unit, yet coupled to and under control of the imaging device 50.

Referring to FIG. 22, an imaging device 50 including a lens focus fix 250 is shown within an enclosure 184. The enclosure 184 can include a front cover 190. In this embodiment, the front cover 190 can include a masked portion 280 and a clearance portion 270 in the front cover 190. The clearance portion can be sized to allow visual access to the selected visual indicator 270 that references the selected lens focal position. The remaining visual indicators 270 for the remaining focal positions can be obstructed by the masked portion 280.

Figure 23:
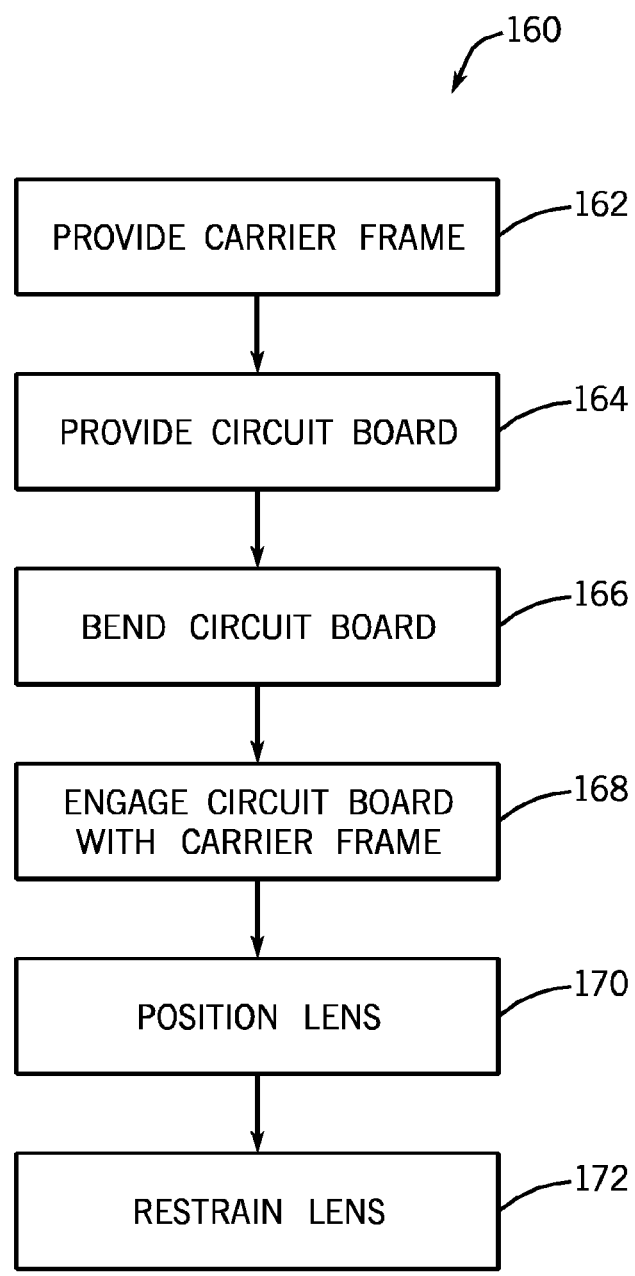
FIG. 23 is a flow chart of a method associated with the electronic device.

FIG. 23 illustrates an embodiment of a method for assembling an electronic device using a carrier frame 54 and rigid-flex PCBs 52. The method shown in FIG. 23 may be used in conjunction with any of the systems or devices shown in the above Figures, among others. In various embodiments, some of the method elements shown may be performed concurrently, in a different order than shown, or may be omitted. Additional method elements may also be performed as desired.

Referring to FIG. 23, a method 160 is shown for assembling an electronic device using a carrier frame 54 and rigid-flex PCBs 52. A first step is to provide a carrier frame 54 adapted to support one or more electronic circuit boards, in this case, rigid-flex PCBs 52, as indicated at process block 162. As previously described, the carrier frame 54 can include a plurality of restraints 90 to support the rigid-flex PCBs 52. At process block 164, the rigid-flex PCBs 52 are provided, and at process block 166 and 168, the rigid-flex PCBs 52 can be bent or folded and engaged with the carrier frame 54. In some embodiments, the rigid-flex PCBs 52 can include a vision sensor 68. With the rigid-flex PCBs 52 positioned on, in, and/or around the carrier frame 54, the lens 70 can be positioned over the vision sensor 68, with the carrier frame 54 supporting the lens 70 over the vision sensor 68, as indicated at process block 170. With the lens 70 positioned, at process block 172, the lens 70 can be restrained with a lens focus fix 100. In some embodiments, the lens focus fix 100 can contact both the lens 70 and the carrier frame 54 to restrain the lens 70 from rotating on its own, and to allow for adjustment of the positioning of the lens 70.

Although the present technology has been described with reference to preferred embodiments, workers skilled in the art will recognize that changes may be made in form and detail without departing from the spirit and scope of the technology. For example, the present technology is not limited to the embodiments of smart cameras and associated devices shown herein and may be practiced with other linescan cameras.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. An electronic device comprising:
an electronic circuit board containing a processing element and a vision sensor, the electronic circuit board comprising a plurality of circuit boards coupled together with flexible circuit board, defining at least three sides of a rectangular box structure to define an interior volume corresponding to the electronic circuit board;
a carrier frame to support the electronic circuit board; and
a lens positioned over the vision sensor and supported by the carrier frame, the lens at least partially positioned within the interior volume corresponding to the electronic circuit board, the lens being adjustable in relation to the carrier frame and distance from the vision sensor,
wherein the electronic circuit board includes a main board and a sensor board connected by a first flexible circuit board, the first flexible circuit board including a bend that disposes the main board and the sensor board along a first side of the interior volume.

2. The electronic device according to claim 1:
wherein an aimer device is supported by at least one of the plurality of circuit boards, and an exchangeable lens is positioned over the aimer device, the exchangeable lens supported by at least one of the carrier frame and the at least one of the plurality of circuit boards.

3. The electronic device according to claim 1:
wherein an illumination device is supported by at least one of the plurality of circuit boards, and an exchangeable lens is positioned over the illumination device, the exchangeable lens supported by at least one of the carrier frame and the at least one of the plurality of circuit boards.

4. The electronic device according to claim 1:
further comprising a lens focus fix coupled to the carrier frame and in contact with the lens to restrain movement of the lens;
wherein the lens focus fix comprises a base, a ratchet portion having a side wall coupled to the base, and a lens retainer portion coupled to the ratchet portion, the side wall including an engagement apparatus and a stop protrusion.

5. The electronic device according to claim 1:
wherein the lens is adjustably threaded to the carrier frame.

6. The electronic device according to claim 1:
wherein the processing element acquires image data from the vision sensor and processes the acquired image data into a processed image.

7. The electronic device according to claim 1:
wherein the processing element is arranged on an outwardly facing surface of the electronic circuit board when the electronic circuit board is supported by the carrier frame to facilitate a reduction in heat from the electronic device.

8. The electronic device according to claim 7:
further comprising a heat sink, the heat sink in thermal communication with an outwardly facing surface of the processing element.

9. The electronic device according to claim 8:
further comprising an enclosure to at least partially house the electronic device, the heat sink comprising at least a portion of the enclosure.

10. The electronic device according to claim 4:
further comprising a restraint to engage the engagement apparatus.

11. The electronic device according to claim 4:
wherein the ratchet portion comprises a ratchet arm, the ratchet arm including an engagement end.

12. The electronic device according to claim 1:
wherein at least two adjacent sides of the interior volume are defined by the plurality of circuit boards.

13. The electronic device according to claim 1:
wherein the lens comprises a liquid lens, the liquid lens to control a focal distance of the electronic device.

14. The electronic device according to claim 1:
wherein one of the plurality of circuit boards includes an aperture, the one of the plurality of circuit boards covering at least a portion of a face of the electronic device such that the aperture is positioned over the lens.

15. The electronic device according to claim 1:
wherein the carrier frame includes a plurality of hooked restraints to secure electronic circuit board to the carrier frame.

16. The electronic device according to claim 1:
wherein the electronic circuit board includes an I/O board and a second flexible circuit board, the second flexible circuit board including a bend that disposes the I/O board along a second side of the interior volume that is adjacent to the first side.

17. The electronic device according to claim 16:
wherein the electronic circuit board includes an illumination board and a third flexible circuit board, the third flexible circuit board including a bend that disposes the illumination board along a third side of the interior volume that is adjacent to the second side and opposite the first side.

18. The electronic device according to claim 17:
wherein the plurality of circuit boards includes an illumination board that covers a portion of the lens and allows light to enter the lens.

19. An electronic device comprising:
an electronic circuit board containing a processing element and a vision sensor, the electronic circuit board comprising a plurality of circuit boards, including:
a first circuit board configured to support the vision sensor;
a second circuit board coupled to the first circuit board via flexible circuit board; and
a third circuit board coupled to the first circuit board via flexible circuit board, the first circuit board, the second circuit board, and the third circuit board arranged to define an interior volume corresponding to the electronic circuit board;
a carrier frame to support the electronic circuit board; and
a lens positioned over the vision sensor and supported by the carrier frame, the lens at least partially positioned within the interior volume of the electronic circuit board, such that the second circuit board and the third circuit board extend along opposite sides of the lens.

20. The electronic device of claim 19, wherein the first circuit board extends between the second circuit board and the third circuit board, the lens positioned substantially parallel to the first circuit board.

21. The electronic device of claim 20, wherein the lens is axially aligned with the vision sensor.

22. The electronic device of claim 19, wherein the plurality of circuit boards further includes a fourth circuit board coupled to the second circuit board via flexible circuit board, the fourth circuit board configured to support an illumination device via an outwardly facing surface.

23. The electronic device of claim 22, wherein the illumination device is positioned substantially parallel to the vision sensor.

24. The electronic device of claim 19,
wherein one of the plurality of circuit boards includes an aperture, the one of the plurality of circuit boards covering at least a portion of a face of the electronic device such that the aperture is positioned over the lens.

\* \* \* \* \*